(12) United States Patent
Wang et al.

(10) Patent No.: US 10,268,304 B2
(45) Date of Patent: Apr. 23, 2019

(54) TOUCH DISPLAY PANEL, MANUFACTURING METHOD FOR THE SAME, DRIVING METHOD FOR THE SAME, AND DISPLAY DEVICE

(71) Applicants: BOE Technology Group Co., Ltd., Beijing (CN); Beijing BOE Optoelectronics Technology Co., Ltd., Beijing (CN)

(72) Inventors: Lei Wang, Beijing (CN); Xiaochuan Chen, Beijing (CN); Haisheng Wang, Beijing (CN); Shengji Yang, Beijing (CN); Rui Xu, Beijing (CN); Qian Wang, Beijing (CN); Changfeng Li, Beijing (CN); Ming Yang, Beijing (CN); Pengcheng Lu, Beijing (CN); Xiaoliang Ding, Beijing (CN); Wei Liu, Beijing (CN); Hongjuan Liu, Beijing (CN); Yingming Liu, Beijing (CN); Weijie Zhao, Beijing (CN); Zhenhua Lv, Beijing (CN); Shijun Wang, Beijing (CN)

(73) Assignees: BOE TECHNOLOGY GROUP CO., LTD., Beijing (CN); BEIJING BOE OPTOELECTRONICS TECHNOLOGY CO., LTD., Beijing (CN)

( * ) Notice: Subject to any disclaimer, the term of this patent is extended or adjusted under 35 U.S.C. 154(b) by 290 days.

(21) Appl. No.: 15/113,776

(22) PCT Filed: Oct. 14, 2015

(86) PCT No.: PCT/CN2015/091921
§ 371 (c)(1),
(2) Date: Jul. 22, 2016

(87) PCT Pub. No.: WO2017/000423
PCT Pub. Date: Jan. 5, 2017

(65) Prior Publication Data
US 2017/0147123 A1 May 25, 2017

(30) Foreign Application Priority Data
Jun. 30, 2015 (CN) .......................... 2015 1 0378155

(51) Int. Cl.
G06F 3/041 (2006.01)
G06F 3/044 (2006.01)

(52) U.S. Cl.
CPC ............ *G06F 3/0416* (2013.01); *G06F 3/044* (2013.01); *G06F 3/0412* (2013.01); *G06F 2203/04103* (2013.01); *G06F 2203/04111* (2013.01)

(58) Field of Classification Search
CPC ....... G06F 3/044; G06F 3/0416; G06F 3/0412
See application file for complete search history.

(56) References Cited

U.S. PATENT DOCUMENTS 9,024,913 B1 * 5/2015 Jung ....................... G06F 3/044
345/174
2008/0129706 A1 6/2008 Kim et al.
(Continued)

FOREIGN PATENT DOCUMENTS

CN 103699284 A 4/2014
CN 103995617 A 8/2014
(Continued)

OTHER PUBLICATIONS

First Office Action, including Search Report, for Chinese Patent Application No. 201510378155.3, dated Aug. 1, 2017, 27 pages.
(Continued)

*Primary Examiner* — Michael A Faragalla
*Assistant Examiner* — Chayce R Bibbee
(74) *Attorney, Agent, or Firm* — Westman, Champlin & Koehler, P.A.

(57) ABSTRACT

The present disclosure provides a touch display panel including a self-capacitance or mutual-capacitance type touch display panel, a manufacturing method and a method driving for the same and a display device. The self-capacitance type touch display panel includes an array substrate having a first metal layer and self-capacitance touch electrodes, and a touch control chip. Each touch electrode includes common electrodes, first metal layer includes touch lead wires corresponding to the touch electrodes, and each touch electrode is connected with the touch control chip via a corresponding touch lead wire. The touch lead wire is configured to transmit a common electrode signal to the touch electrode during a display stage, to transmit a touch scan signal to the touch electrode during a touch stage, and (Continued)

to transmit a touch signal, which is generated by the touch electrode at a position where a touch operation occurs, to the touch control chip.

18 Claims, 14 Drawing Sheets

(56) References Cited

U.S. PATENT DOCUMENTS

2015/0372014 A1* 12/2015 Gao .................. H01L 27/124
257/72
2016/0004346 A1 1/2016 Zhao

FOREIGN PATENT DOCUMENTS

| CN | 104699351 A | 6/2015 |
| CN | 104699356 A | 6/2015 |
| CN | 204706018 U | 10/2015 |

OTHER PUBLICATIONS

International Search Report and Written Opinion for International Application No. PCT/CN2015/091921, dated Mar. 24, 2016, 11 pages.
English translation of Box No. V of the Written Opinion of the International Searching Authority for International Application No. PCT/CN2015/091921, 2 pages.

* cited by examiner

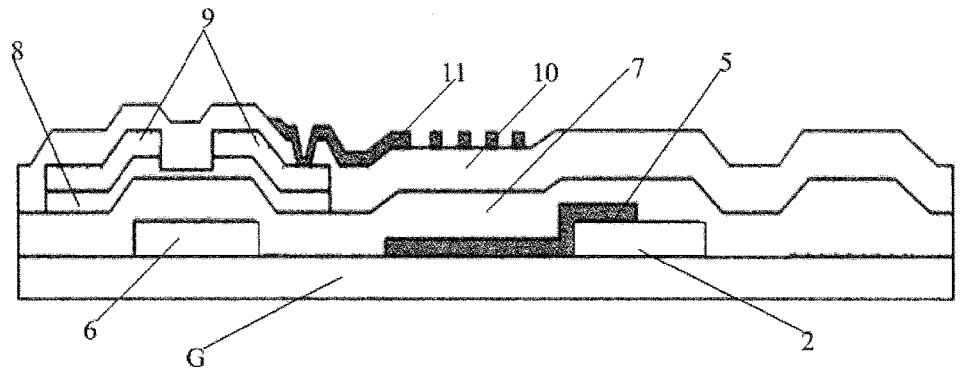

Fig. 17

S401 — during a display stage, applying a common electrode signal to the touch driving lead wires of the touch display panel while sequentially applying a gate scan signal to gate lines and a data signal to data lines of the touch display panel S402 — during a touch stage, applying a touch scan signal to the touch driving lead wires of the touch display panel while applying synchronization signals modulated with the touch scan signal to the gate lines and the data lines of the touch display panel, such that the touch sensing electrode couples the touch scan signal and output the coupled touch signal to the touch control chip, and the touch control chip determines a position where a touch operation occurs based on the touch signal

Fig. 18

TOUCH DISPLAY PANEL, MANUFACTURING METHOD FOR THE SAME, DRIVING METHOD FOR THE SAME, AND DISPLAY DEVICE

CROSS-REFERENCE TO RELATED APPLICATION

This Application is a Section 371 National Stage Application of International Application No. PCT/CN2015/091921, filed 14 Oct. 2015, entitled "TOUCH DISPLAY PANEL, MANUFACTURING METHOD FOR THE SAME, DRIVING METHOD FOR THE SAME, AND DISPLAY DEVICE", which has not yet published, and which claims priority to Chinese Application No. 201510378155.3, filed on 30 Jun. 2015, incorporated herein by reference in their entirety.

BACKGROUND OF THE INVENTION

Field of the Invention

The present disclosure generally relates to the field of display technologies, and in particular, to a touch display panel, a method of manufacturing the touch display panel, a method for driving the touch display panel, and a display device.

Description of the Related Art

Currently, with development of display technologies, the display technologies are widely applied in a television, a mobile phone and display of common information, and a large-sized display panel has gradually become an important part of people's life. Meanwhile, with fast development of display technologies, a touch screen (Touch Screen Panel) has gradually become popular in people's life, but in the today's pursuit of excellent experience function, touch control performance has always been a significant defect for the large-sized display panel, which performance is limited to technologies or to cost.

With development of touch screen technologies and with market requirements, the market development trend is to thin the whole module, thus a touch structure is developed from a touch sensing On-Cell configuration to a touch sensing In-Cell configuration, which not only enables reduction in thickness of the touch panel, but also enables a great reduction in cost of the touch screen. At present, In-Cell touch panel mainly includes three types including a resistance type touch panel, a capacitance type touch panel and an optical type touch panel. Corresponding In-Cell touch control technologies have been primarily applied in small-sized display screens so as to achieve excellent touch control performance and accordingly become future direction for touch design. Thus, the In-Cell touch control technologies also provide a direction for trying to obtain excellent touch control performance in large-sized display panels.

In prior arts, the operation principle of a self-capacitance type touch panel is shown in FIG. 1. Generally, a single touch point electrode m is designed as a quadrate electrode of about 5 mm*5 mm, then the electrode is connected to interior of a touch control chip p via a wire n, a driving signal is applied to the electrode from the touch control chip p, and the electrode m itself may receive a feedback signal, that is, the capacitance carried over the electrode m is a fixed value when a finger does not touch the electrode; when the finger touches the electrode, the capacitance carried over the electrode m is a finger capacitance plus the initial capacitance. Since RC delay (resistance capacitance delay) of a signal will vary depending on the magnitude of the capacitance, different electrical signals will be received before and after the finger touches the electrode, thereby the touch point could be determined. Since a finger touch operation is directed to a direct capacitance coupling mode, variation in capacitance due to the finger touch operation will be larger, such that the touch point could be easily determined. In this design, however, wiring connecting the electrode and the touch control chip needs to be routed in an edge frame region at either side of the touch panel, which will require increase in the area of the edge frame region and thus does not facilitate narrow frame design for the touch panel.

Thus, one technical problem to be solved urgently by those skilled in the art is how to achieve narrow frame design for the touch display panel while improving the touch control performance of the touch display panel.

SUMMARY

At least one of embodiments of the present disclosure provides a touch display panel, a method of manufacturing the touch display panel, a method for driving the touch display panel, and a display device, for achieving narrow frame design for the touch display panel while improving the touch control performance of the touch display panel.

An embodiment of the present disclosure provides a self-capacitance type touch display panel, comprising: an array substrate provided with a first metal layer and self-capacitance touch electrodes, and a touch control chip; wherein each of the self-capacitance touch electrodes comprises a plurality of common electrodes, the first metal layer comprises a plurality of touch lead wires corresponding to the respective self-capacitance touch electrodes one to one, and each of the self-capacitance touch electrodes is connected with the touch control chip via a corresponding touch lead wire;

the touch lead wire is configured to transmit a common electrode signal to the self-capacitance touch electrode during a display stage, to transmit a touch scan signal to the self-capacitance touch electrode during a touch stage, and to transmit a touch signal, which is generated by the self-capacitance touch electrode at a position where a touch operation occurs, to the touch control chip.

In one possible implementation, in the above self-capacitance type touch display panel according to the embodiment of the present disclosure, when a gate electrode metal layer is arranged immediately adjacent to a base substrate of the array substrate, the first metal layer is located between the gate electrode metal layer and a source/drain electrode layer, and these three layers are insulated from one another; or the first metal layer is located above and insulated from the source/drain electrode layer.

In one possible implementation, in the above self-capacitance type touch display panel according to the embodiment of the present disclosure, the touch lead wire comprises a first portion extending in a direction of a gate line and a second portion extending in a direction of a data line.

In one possible implementation, in the above self-capacitance type touch display panel according to the embodiment of the present disclosure, the first metal layer comprises a plurality of pedestals corresponding to the respective self-capacitance touch electrodes one to one; and the pedestal is provided therein with a via hole, via which the self-capacitance touch electrode is connected with the corresponding touch lead wire.

In one possible implementation, in the above self-capacitance type touch display panel according to the embodiment of the present disclosure, the self-capacitance touch electrodes are arranged in a matrix and the plurality of common electrodes of each self-capacitance touch electrode are also arranged in a matrix, a plurality of common electrodes of each row of common electrodes of each self-capacitance touch electrode are connected with one another via connection lines, and common electrodes of each self-capacitance touch electrode located in adjacent rows and in a same column are connected with one another via jumpers in the first metal layer or via jumpers in a pixel electrode layer.

In one possible implementation, in the above self-capacitance type touch display panel according to the embodiment of the present disclosure, the connection lines connecting the plurality of common electrodes of each row of common electrodes of each self-capacitance touch electrode are located in a same layer as a gate line and in parallel with each other.

In one possible implementation, the above self-capacitance type touch display panel according to an embodiment of the present disclosure further comprises a second metal layer, which is located in a same layer as the gate electrode metal layer and is arranged in parallel connection with the first metal layer.

An embodiment of the present disclosure provides a method of manufacturing the self-capacitance type touch display panel according to the embodiment of the present application, comprising:

forming a pattern of self-capacitance touch electrodes which are arranged in a matrix on a base substrate, each formed self-capacitance touch electrode comprising a plurality of common electrodes; and forming a pattern of first metal layer on the base substrate formed with the pattern of self-capacitance touch electrodes.

In one possible implementation, in the method of manufacturing the above self-capacitance type touch display panel according to the embodiment of the present disclosure, before or after forming the pattern of self-capacitance touch electrodes in a matrix on the base substrate, the method further comprises:

forming a pattern of a gate electrode, a gate line and a connection line through one time patterning process.

In one possible implementation, in the method of manufacturing the above self-capacitance type touch display panel according to an embodiment of the present disclosure, before or after forming the pattern of self-capacitance touch electrodes in a matrix on the base substrate, the method further comprises:

forming a pattern of a gate electrode, a gate line, a connection line and a second metal layer through one time patterning process.

In one possible implementation, in the method of manufacturing the above self-capacitance type touch display panel according to an embodiment of the present disclosure, forming the pattern of first metal layer on the base substrate formed with the pattern of self-capacitance touch electrodes comprises:

forming a pattern of source/drain electrode layer on the base substrate formed with the pattern of first metal layer; or forming the pattern of the first metal layer on the base substrate formed with the pattern of source/drain electrode layer.

In one possible implementation, the method of manufacturing the above self-capacitance type touch display panel according to an embodiment of the present disclosure further comprises:

forming a pattern comprising a passivation layer and a pixel electrode on the base substrate formed with the pattern of first metal layer.

An embodiment of the present disclosure provides a method for driving the self-capacitance type touch display panel as described above, comprising:

during a display stage, applying a common electrode signal to the touch lead wires of the touch display panel while sequentially applying a gate scan signal to gate lines and a data signal to data lines of the touch display panel; and during a touch stage, applying a touch scan signal to the touch lead wires of the touch display panel while applying synchronization signals modulated with the touch scan signal to the gate lines and the data lines of the touch display panel, such that a touch signal, which is generated by the self-capacitance touch electrode at a position where a touch operation occurs, is transmitted by the touch lead wire to the touch control chip, and the position where the touch operation occurs is determined by the touch control chip based on the touch signal.

An embodiment of the present disclosure provides a mutual-capacitance type touch display panel, comprising: an array substrate provided with a first metal layer and touch driving electrodes arranged in a matrix, a touch control chip and a color filter substrate provided with touch sensing electrodes; wherein each touch driving electrode comprises a plurality of common electrodes, the first metal layer comprises a plurality of touch driving lead wires corresponding to respective columns of touch driving electrodes one to one, each column of touch driving electrodes being connected with the touch control chip via a corresponding touch driving lead wire;

the touch driving lead wire is configured to transmit a common electrode signal to the touch driving electrode during a display stage and to transmit a touch scan signal to the touch driving electrode during a touch stage, the touch sensing electrode is configured to couple the touch scan signal and output the coupled touch signal to the touch control chip, and the touch control chip is configured to determine a position where a touch operation occurs based on the touch signal.

In one possible implementation, in the above mutual-capacitance type touch display panel according to the embodiment of the present disclosure, if a gate electrode metal layer is arranged immediately adjacent to a base substrate of the array substrate, the first metal layer is located between the gate electrode metal layer and a source/drain electrode layer, and these three layers are insulated from one another; or the first metal layer is located above and insulated from the source/drain electrode layer.

In one possible implementation, in the above mutual-capacitance type touch display panel according to the embodiment of the present disclosure, the touch driving lead wire comprises a first portion extending in a direction of a gate line and a second portion extending in a direction of a data line.

In one possible implementation, in the above mutual-capacitance type touch display panel according to the embodiment of the present disclosure, the first metal layer comprises a plurality of pedestals corresponding to the respective touch driving electrodes one to one; and the pedestal is provided therein with a via hole, via which the touch driving electrode is connected with the corresponding touch driving lead wire.

In one possible implementation, in the above mutual-capacitance type touch display panel according to the embodiment of the present disclosure, the plurality of common electrodes of each touch driving electrode are arranged in a matrix, a plurality of common electrodes of each row of common electrodes of each touch driving electrode are connected with one another via connection lines, and common electrodes of each touch driving electrode located in adjacent rows and in a same column are connected with one another via jumpers in the first metal layer or via jumpers in a pixel electrode layer.

In one possible implementation, in the above mutual-capacitance type touch display panel according to the embodiment of the present disclosure, the connection lines connecting the plurality of common electrodes of each row of common electrodes of each touch driving electrode are located in a same layer as a gate line and in parallel with each other.

In one possible implementation, the above mutual-capacitance type touch display panel according to the embodiment of the present disclosure further comprises a second metal layer, which is located in a same layer as the gate electrode metal layer and is arranged in parallel connection with the first metal layer.

In one possible implementation, in the above mutual-capacitance type touch display panel according to the embodiment of the present disclosure, the first metal layer comprises two sets of touch driving lead wires arranged in a bilateral symmetry way, each column of touch driving electrode corresponds to two touch driving lead wires.

In one possible implementation, in the above mutual-capacitance type touch display panel according to the embodiment of the present disclosure, the common electrode is provided between two adjacent rows of touch driving electrodes, and the touch sensing electrodes on the color filter substrate are arranged to correspond to and to be parallel to respective ones of the common electrodes.

An embodiment of the present disclosure provides a method of manufacturing the mutual-capacitance type touch display panel as described above, comprising:

forming a pattern of touch driving electrodes which are arranged in a matrix on a base substrate, each touch driving electrode comprising a plurality of common electrodes;

forming a pattern of a first metal layer on the base substrate formed with the pattern of touch driving electrodes; and forming a pattern of touch sensing electrodes on a color filter substrate.

In one possible implementation, before or after forming the pattern of touch driving electrodes which are arranged in a matrix on the base substrate, the method further comprises:

forming a pattern of a gate electrode, a gate line and a connection line through one time patterning process.

In one possible implementation, before or after forming the pattern of touch driving electrodes which are arranged in a matrix on the base substrate, the method further comprises:

forming a pattern of a gate electrode, a gate line, a connection line and a second metal layer through one time patterning process.

In one possible implementation, in the method of manufacturing the mutual-capacitance type touch display panel as described above according to the embodiment of the present disclosure, forming the pattern of first metal layer on the base substrate formed with the pattern of touch driving electrodes comprises:

forming a pattern of source/drain electrode layer on the base substrate formed with the pattern of first metal layer; or forming the pattern of the first metal layer on the base substrate formed with the pattern of source/drain electrode layer.

In one possible implementation, the method of manufacturing the mutual-capacitance type touch display panel as described above further comprises:

forming a pattern comprising a passivation layer and a pixel electrode on the base substrate formed with the pattern of the first metal layer.

An embodiment of the present disclosure provides a method of driving the mutual-capacitance type touch display panel as described above, comprising:

during a display stage, applying a common electrode signal to the touch driving lead wires of the touch display panel while sequentially applying a gate scan signal to gate lines and a data signal to data lines of the touch display panel; and during a touch stage, applying a touch scan signal to the touch driving lead wires of the touch display panel while applying synchronization signals modulated with the touch scan signal to the gate lines and the data lines of the touch display panel, such that the touch sensing electrode couples the touch scan signal and outputs the coupled touch signal to the touch control chip, and the touch control chip determines a position where a touch operation occurs based on the touch signal.

An embodiment of the present disclosure provides a display device, comprising the above self-capacitance type touch display panel according to embodiments of the present disclosure or the above mutual-capacitance type touch display panel according to embodiments of the present disclosure.

Advantageous effects obtained according to embodiments of the present disclosure include at least one of the following aspects:

Embodiments of the present disclosure provide a touch display panel, a method of manufacturing the touch display panel, a method for driving the touch display panel, and a display device, and the touch display panel includes a self-capacitance type touch display panel or a mutual-capacitance type touch display panel. In the self-capacitance type touch display panel, the common electrode is reused as a self-capacitance touch electrode during a touch stage; a separate first metal layer is provided, touch lead wires are provided in the first metal layer, respective self-capacitance touch electrodes are connected with the touch control chip via the touch lead wires, thereby achieving a touch function.

In the mutual-capacitance type touch display panel, the common electrode is reused as a touch driving electrode during a touch stage; a separate first metal layer is provided, touch driving lead wires are provided in the first metal layer, such that the touch driving lead wire and a touch sensing electrode on a color filter substrate form mutual-capacitance so as to enable a touch function. Compared to prior arts in which the touch lead wire or touch driving lead wire is provided in a peripheral region of the display panel so as to provide the touch function, the touch display panel according to embodiments of the present disclosure is provided with a separate first metal layer, such that the touch lead wire or touch driving lead wire may be arranged above an existing peripheral circuit pattern, which needs no more space in the frame region relative to prior arts and thus facilitate a narrow frame design; meanwhile, the common electrode can be reused as the self-capacitance touch electrode or touch driving electrode, and the common electrode is located in a region defined between adjacent gate lines and data lines, such that the common electrode will not overlap the gate lines and the data lines, and parasitic capacitance between the self-capacitance touch electrode or touch driving electrode and other signal lines is very small during the touch stage, which will facilitate to improve touch control performance.

BRIEF DESCRIPTION OF THE DRAWINGS

FIG. 17 is a cross sectional view of a structure of another example of an array substrate of the mutual-capacitance type touch display panel according to an embodiment of the present disclosure; and FIG. 18 is flow chart showing a method of driving the mutual-capacitance type touch display panel according to an embodiment of the present disclosure.

DETAINED DESCRIPTION OF PREFERRED EMBODIMENTS

Figure 1:
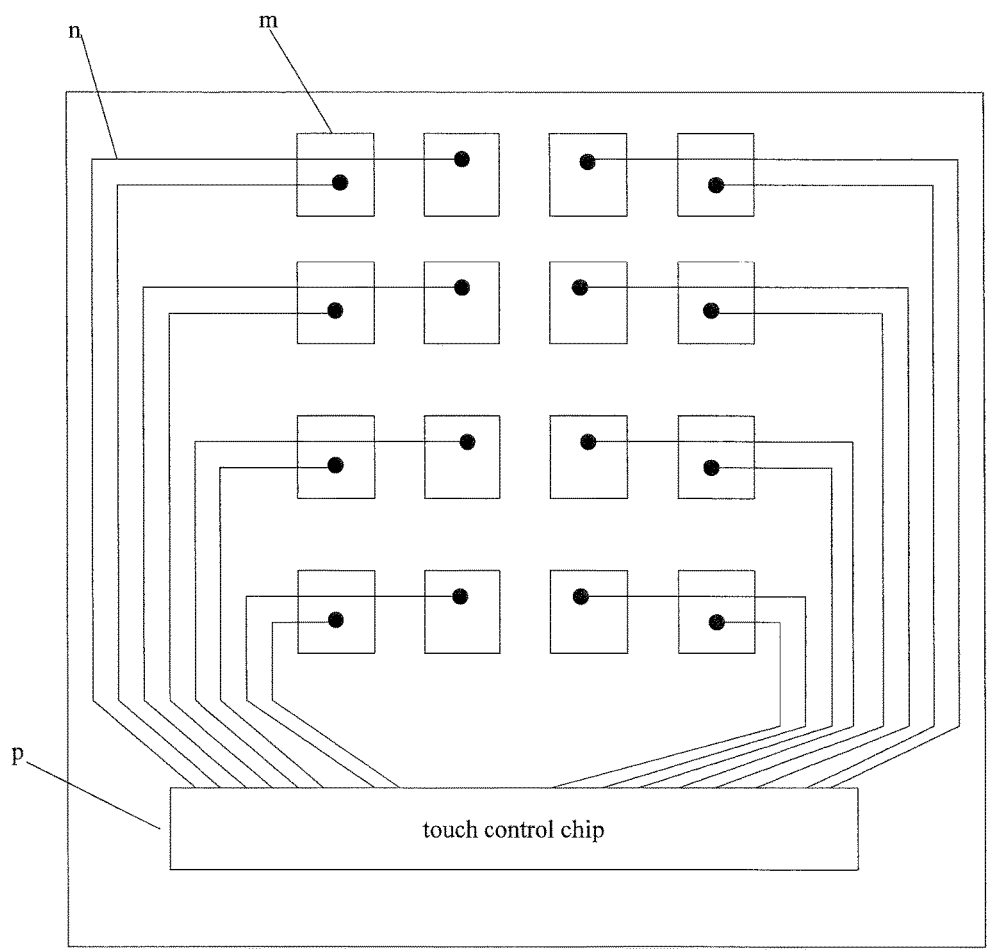
FIG. 1 is a structural schematic diagram of a self-capacitance type touch display panel in the prior art.

Hereinafter, a touch display panel, a method of manufacturing the touch display panel, a method for driving the touch display panel and a display device provided according to exemplary embodiments of the present disclosure will be described in detail with reference to the accompanying drawings.

Thicknesses of layers and sizes and shapes of regions shown in the drawings do not represent true proportions of parts of the touch display panel, but are only intended to schematically illustrate contents of the present disclosure.

Figure 2:
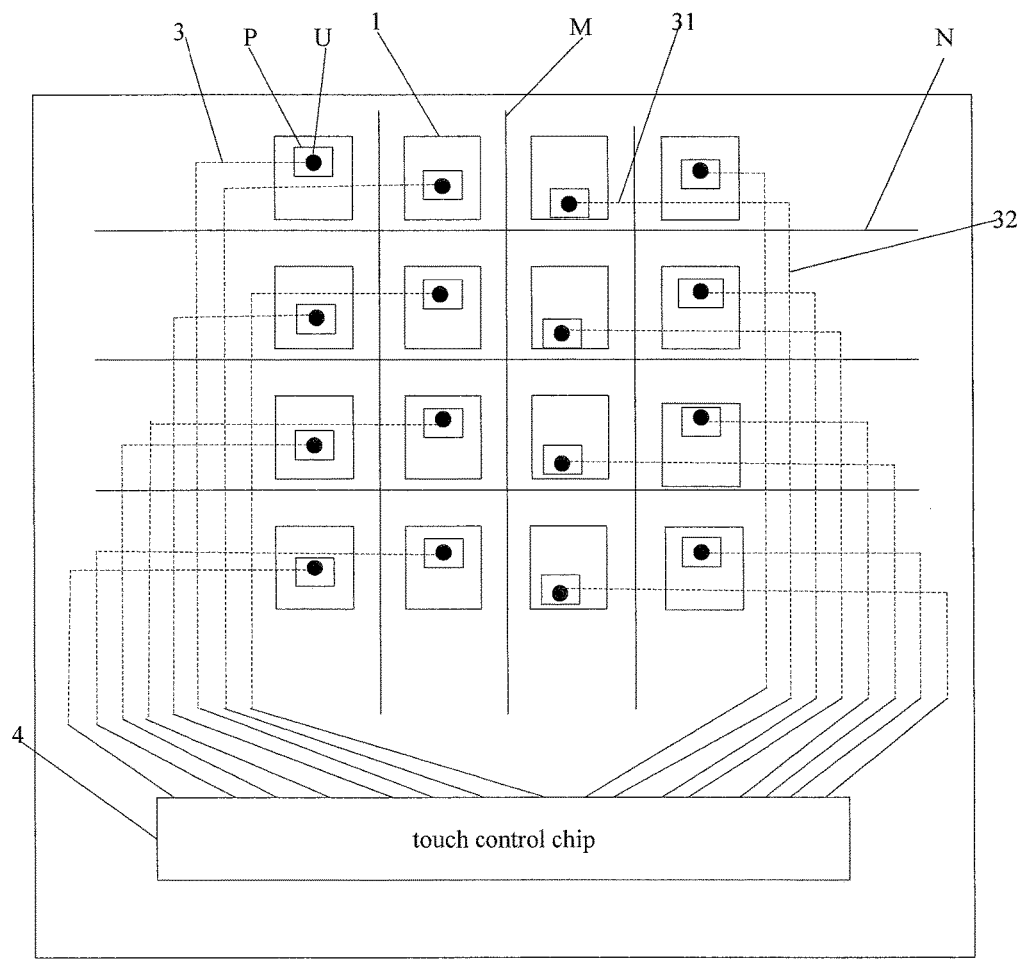
FIG. 2 is a structural schematic diagram of an array substrate of a self-capacitance type touch display panel according to an embodiment of the present disclosure.
Figure 3:
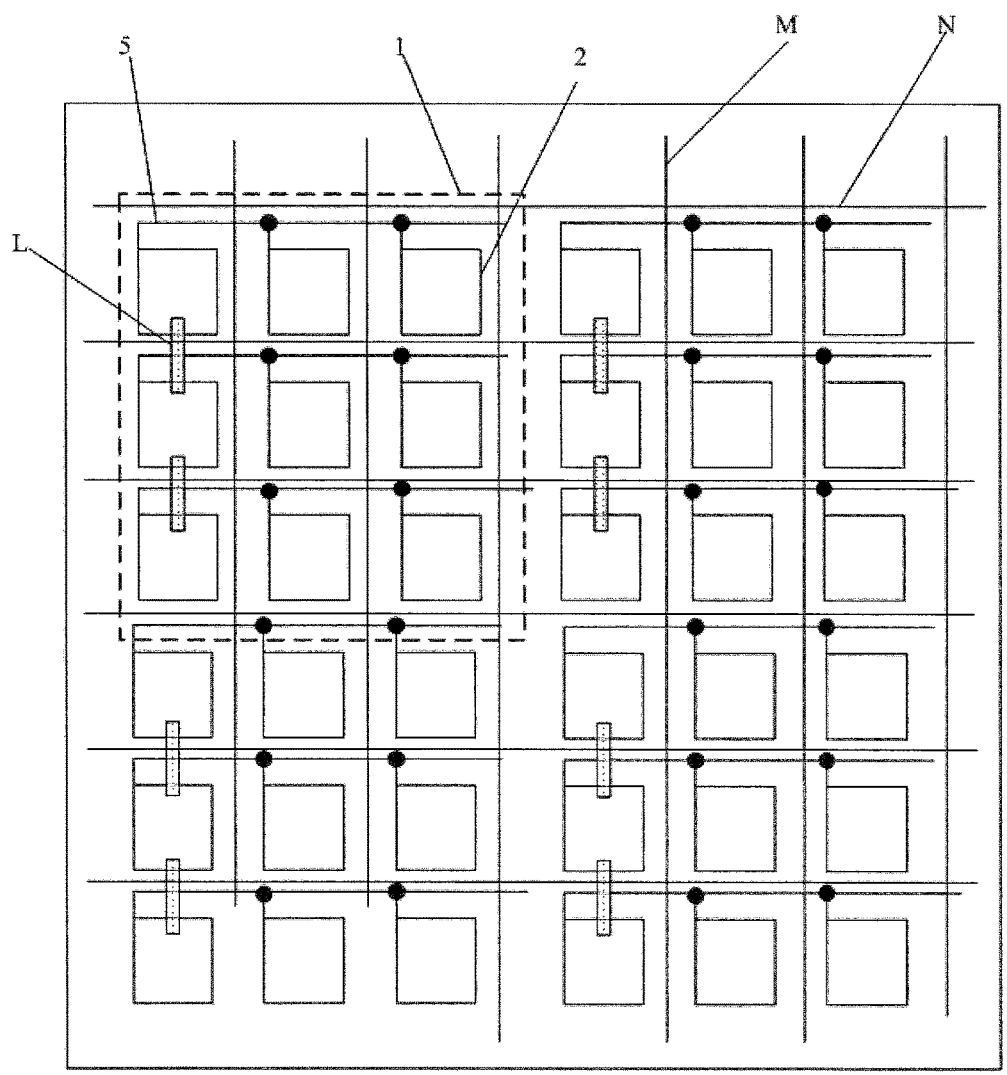
FIG. 3 is a structural schematic diagram of a self-capacitance touch electrode according to an embodiment of the present disclosure.

A self-capacitance type touch display panel according to an embodiment of the present disclosure provides, as shown in FIG. 2, may comprise: an array substrate provided with a first metal layer and self-capacitance touch electrodes 1 arranged in a matrix, and a touch control chip 4. As shown in FIG. 3, each self-capacitance touch electrode 1 comprises a plurality of common electrodes 2; as shown in FIG. 2, the first metal layer comprises a plurality of touch lead wires 3 corresponding to the self-capacitance touch electrodes 1 one to one, and each self-capacitance touch electrode 1 is connected with the touch control chip 4 via a corresponding touch lead wire 3.

The touch lead wire 3 is configured to transmit a common electrode signal to the self-capacitance touch electrode 1 during a display stage, to transmit a touch scan signal to the self-capacitance touch electrode 1 during a touch stage, and to transmit a touch signal, which is generated by the self-capacitance touch electrode 1 at a position where a touch operation occurs, to the touch control chip 4.

The above self-capacitance type touch display panel according to the embodiment of the present disclosure may comprise an array substrate provided with a first metal layer and self-capacitance touch electrodes 1 arranged in a matrix, each self-capacitance touch electrode 1 comprises a plurality of common electrodes 2, the first metal layer comprises a plurality of touch lead wires 3 corresponding to the self-capacitance touch electrodes 1 one to one, and each self-capacitance touch electrode 1 is connected with the touch control chip 4 via a corresponding touch lead wire 3; the touch lead wire 3 is configured to transmit a common electrode signal to the self-capacitance touch electrode 1 during a display stage, to transmit a touch scan signal to the self-capacitance touch electrode 1 during a touch stage, and to transmit a touch signal, which is generated at a position where a touch operation occurs, to the touch control chip 4. With such self-capacitance type touch display panel, the common electrode is reused as a self-capacitance touch electrode during the touch stage; the first metal layer is separately provided, the touch lead wires are provided in the first metal layer, respective self-capacitance touch electrodes are connected with the touch control chip via the corresponding touch lead wires, thereby enabling a touch function. Compared to prior arts in which the touch lead wire is provided in peripheral region of the display panel so as to provide the touch function, the touch display panel according to the embodiment of the present disclosure is provided with the separate first metal layer, such that the touch lead wire may be arranged over or above an existing peripheral circuit pattern, which needs no more space in the frame region relative to prior arts and thus facilitate a narrow frame design; meanwhile, the common electrode can be reused as the self-capacitance touch electrode during the touch stage, and the common electrode 2 may be located in a region defined between adjacent gate lines N and data lines M as shown in FIG. 3, such that the common electrode 2 will not overlap the gate lines N and the data lines M, and parasitic capacitance between the self-capacitance touch electrode or touch driving electrode and other signal lines is very small during the touch stage, which will facilitate to improve touch control performance.

Figure 4:
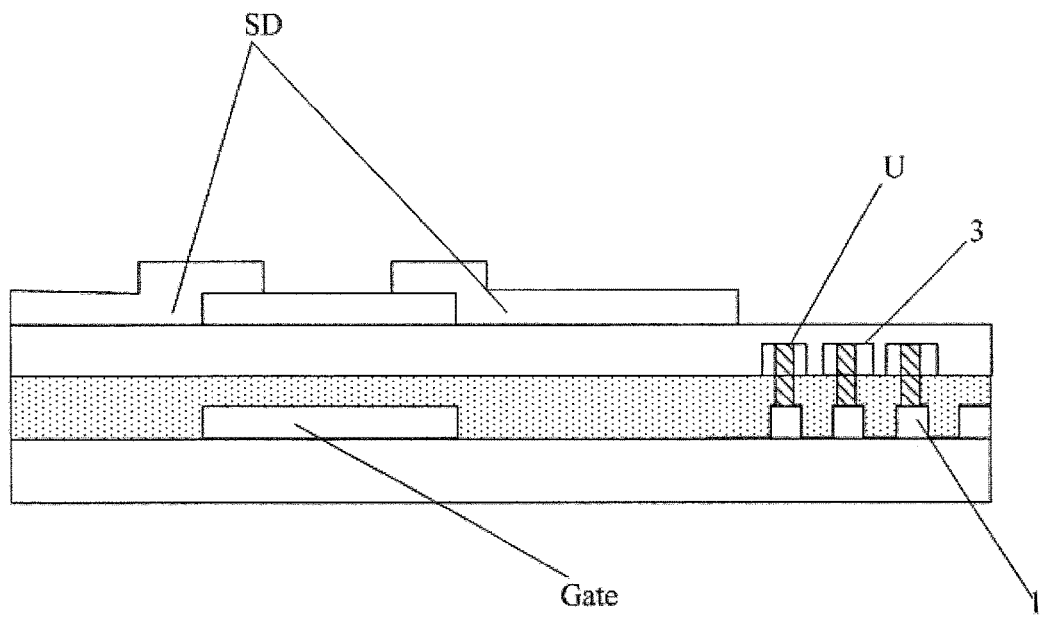
FIG. 4 is a cross sectional view showing a structure of an array substrate of a self-capacitance type touch display panel according to an embodiment of the present disclosure.

When being particularly implemented, in the above self-capacitance type touch display panel according to the embodiment of the present disclosure, in order to achieve a touch function of the self-capacitance type touch display panel during a touch stage, the first metal layer is separately provided, and thereby the touch lead wires are provided in the first metal layer. As such, compared to prior arts in which the edge frame region of the display panel is increased such that the touch lead wire is provided therein, the touch display panel according to the embodiment of the present disclosure is provided with the separate first metal layer in which the touch lead wires are provided, thereby a narrow frame design can be achieved for the touch display panel. As shown in FIG. 4, when a gate electrode metal layer Gate is arranged immediately adjacent to a base substrate of the array substrate, the first metal layer in which the touch lead wires are provided (or where the touch lead wires 3 are located) is located between the gate electrode metal layer Gate and a source/drain electrode layer SD, and these three layers are insulated from one another. In an example, a via hole U is provided at a position at which the touch lead wire 3 is connected with the self-capacitance touch electrode 1, for providing electrical connection between the self-capacitance touch electrode 1 and the touch lead wire 3. The first metal layer may be also located above and insulated from the source/drain electrode layer, so as to provide the connection between the touch lead wire and the self-capacitance touch electrode. The touch lead wires can be provided in the first metal layer by each of the two above described ways; of course, the position where the first metal layer is located may be adjusted according to actual production processes and product requirements so as to provide the touch function, which will not be limited herein.

When being particularly implemented, in the above self-capacitance type touch display panel according to the embodiment of the present disclosure, in order to connect respective self-capacitance touch electrodes to the touch control chip so as to achieve the touch function of the touch display panel during the touch stage, respective self-capacitance touch electrodes are connected with the touch control chip by corresponding touch lead wires in an one to one way; since the self-capacitance touch electrodes are arranged in a matrix as shown in FIG. 2, the touch lead wire 3 comprises a first portion 31 extending in a direction of the gate line N and a second portion 32 extending in a direction of the data line M. As such, the touch lead wires 3 correspond to the respective self-capacitance touch electrodes 1 one to one, such that the first portions 31 extending in the direction of the gate line N are connected with the respective self-capacitance touch electrodes 1, and the second portions 32 extending in the direction of the data line M are connected with the touch control chip 4; in this connection way, the touch control chip 4 is arranged to extend in the direction of the data line. Alternatively, the second portions 32 extending in the direction of the data line M may be connected with the respective self-capacitance touch electrodes, and the first portions extending in the direction of the gate line are connected to the touch control chip; in this connection way, the touch control chip is arranged to extend in the direction of the gate line. The ways for connecting the touch electrode with the touch control chip are not limited herein.

When being particularly implemented, in the above self-capacitance type touch display panel according to the embodiment of the present disclosure, as shown in FIG. 2, the first metal layer comprise: a plurality of pedestals P corresponding to the self-capacitance touch electrodes 1 one to one; and the pedestal P is provided therein with the via hole U, via which the self-capacitance touch electrode 1 is connected with the corresponding touch lead wire 3.

Specifically, in the above self-capacitance type touch display panel according to the embodiment of the present disclosure, in order to achieve the connection between the self-capacitance touch electrode 1 and the touch lead wire 3, the via hole connection is provided between the self-capacitance touch electrode 1 and the touch lead wire 3. In order to facilitate implementation of processes for forming the via hole, pedestals P may be provided on the first metal layer to correspond to the self-capacitance touch electrodes 1 one to one, such that implementation of the processes for forming the via hole may be facilitated at the position of the pedestal P, thereby it will facilitate to achieve a good electrical connection of the self-capacitance touch electrode with the touch lead wire. Of course, those skilled in the art could determine, according to requirements, whether the pedestal P needs to be provided or not; that is, the self-capacitance touch electrodes 1 may be connected with respective touch lead wires 3 through the pedestals P, or may be directly connected with the respective touch lead wires 3.

When being particularly implemented, in the above self-capacitance type touch display panel according to the embodiment of the present disclosure, as shown in FIG. 3, the plurality of common electrodes 2 of each self-capacitance touch electrode 1 may be arranged in a matrix, a plurality of the common electrodes 2 of each row of common electrodes of each self-capacitance touch electrode 1 are connected with one another via connection lines 5, and common electrodes 2 of each self-capacitance touch electrode 1 located in adjacent rows and in the same column are connected with one another via jumpers L in the first metal layer or via jumpers L in a pixel electrode layer.

Specifically, in the above self-capacitance type touch display panel according to the embodiment of the present disclosure, the common electrode 2 is reused as the self-capacitance touch electrode so as to provide the touch function during the touch stage. In an example, the common electrode is located on the base substrate of the array substrate and in the same layer as the gate electrode, and each self-capacitance touch electrode comprises a plurality of the common electrodes. In order to achieve the touch function of the self-capacitance touch electrode, it is required to connect plurality of the common electrodes of each self-capacitance touch electrode together to form a complete self-capacitance touch electrode, so that the touch function of the self-capacitance touch electrode can be achieved. Generally, the plurality of common electrodes of each self-capacitance touch electrode may be arranged in a matrix, thus a plurality of common electrodes of each row of common electrodes of each self-capacitance touch electrode may be connected with one another via connection lines, and common electrodes of each self-capacitance touch electrode located in adjacent rows may be connected with one another via jumpers in the first metal layer or via jumpers in a pixel electrode layer. As such, an existing metal layer, for example, the first metal layer or pixel electrode layer, of the array substrate may be utilized; of course, other metal layer in which jumpers may be provided to connect the common electrodes in adjacent rows may be used such that the common electrodes in adjacent rows may be connected with one another via the jumpers provided in the other metal layer and are prevented from crossing the gate lines to form short circuit, thus respective common electrodes of one self-capacitance touch electrode are connected into a whole, thereby the touch function of the self-capacitance touch electrode can be achieved, and meanwhile, the existing metal layer is used to provide the jumpers, which may simplify processes of manufacturing the array substrate and arrangement of layers and reduce production cost.

When being particularly implemented, in the above self-capacitance type touch display panel according to the embodiment of the present disclosure, the connection lines connecting the plurality of common electrodes of each row of common electrodes of each self-capacitance touch electrode are located in the same layer as and in parallel with each other.

Specifically, in the above self-capacitance type touch display panel according to the embodiment of the present disclosure, the common electrodes may be located in the same layer as gate electrodes on the base substrate, thus the connection lines connecting the plurality of common electrodes of each row of common electrodes of each self-capacitance touch electrode may be located in the same layer as and in parallel with each other. Of course, the connection line may be made of a material of a metal for the gate electrode, so that the gate electrode, the gate line and the connection line may be formed through one time patterning process during manufacturing the array substrate, which may simplify the processes of manufacturing the array substrate and reduce production cost.

When being particularly implemented, the above self-capacitance type touch display panel according to an embodiment of the present disclosure may further comprise a second metal layer, which is located in the same layer as the gate electrode metal layer and is arranged in parallel connection with the first metal layer.

Specifically, in the above self-capacitance type touch display panel according to the embodiment of the present disclosure, the resistance of the touch lead wire in the first metal layer may be further reduced in order to increase a driving frequency for the touch display panel; that is, the second metal layer is provided in the metal layer of the gate electrode in a pattern including a plurality of common electrodes, and is arranged in parallel with the touch lead wire in the first metal layer, such that the common electrode and the gate electrode in the second metal layer may be formed through one time patterning process, and the common electrode in the second metal layer is connected with the touch lead wire in the first metal layer via the via hole at a corresponding position so as to form a parallel arrangement. As such, a parallel arrangement of the first metal layer and the second metal layer may be achieved, thereby the resistance of the first metal layer may be reduced, and the touch driving frequency for the touch display panel may be increased by about 30%.

Figure 5:
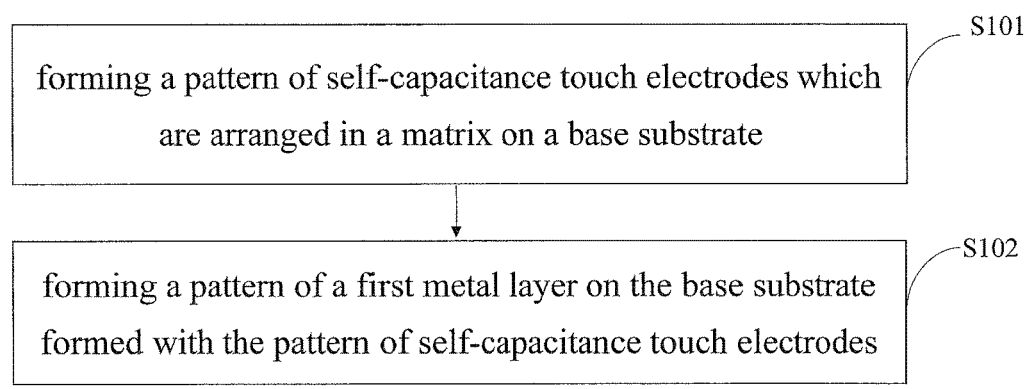
FIG. 5 is a flow chart showing a method of manufacturing the self-capacitance type touch display panel according to an embodiment of the present disclosure.

Based on the same inventive concept, an embodiment of the present disclosure provides a method of manufacturing the above self-capacitance type touch display panel according to embodiments of the present disclosure. In an example, as shown in FIG. 5, the method may comprise steps of:

S101: forming a pattern of self-capacitance touch electrodes which are arranged in a matrix on a base substrate, each formed self-capacitance touch electrode comprising a plurality of common electrodes; and S102: forming a pattern of the first metal layer on the base substrate formed with the pattern of self-capacitance touch electrodes;

In one example, the formed first metal layer comprises a plurality of touch lead wires corresponding to the self-capacitance touch electrodes one to one, and each self-capacitance touch electrode is connected with the touch control chip via a corresponding touch lead wire.

The touch lead wire is configured to transmit a common electrode signal to the self-capacitance touch electrode during a display stage, to transmit a touch scan signal to the self-capacitance touch electrode during a touch stage, and to transmit a touch signal, which is generated by the self-capacitance touch electrode at a position where a touch operation occurs, to the touch control chip.

In the method of manufacturing the above self-capacitance type touch display panel according to the embodiment of the present disclosure, the pattern of self-capacitance touch electrodes are formed and arranged in a matrix on the base substrate, the formed self-capacitance touch electrode comprises a plurality of common electrodes, and a pattern of the first metal layer is formed on the base substrate formed with the pattern of self-capacitance touch electrodes, the formed first metal layer comprises a plurality of touch lead wires corresponding to the self-capacitance touch electrodes one to one, and each self-capacitance touch electrode is connected with the touch control chip via a corresponding touch lead wire; that is, there is separately provided the first metal layer in which the touch lead wires are provided, respective self-capacitance touch electrodes are connected with the touch control chip via corresponding touch lead wires, thereby enabling a touch function. Compared to prior arts in which the touch lead wire is provided in peripheral region of the display panel so as to provide the touch function, the self-capacitance type touch display panel provided according to the embodiment of the present disclosure is provided with the separate first metal layer, such that the touch lead wire may be arranged over or above an existing peripheral circuit pattern, which needs no more space in the frame region relative to prior arts and thus facilitate a narrow frame design; meanwhile, the common electrode can be reused as the self-capacitance touch electrode, and the common electrode may be located in a region defined between adjacent gate lines and data lines, such that the common electrode will not overlap with the gate lines and the data lines, and parasitic capacitance between the self-capacitance touch electrode and other signal lines is smaller during the touch stage, which may ensure that there is sufficient time for touch driving scan and will facilitate touch driving scan and sensing, thereby facilitating improvement of touch control performance.

When being particularly implemented, the method of manufacturing the above self-capacitance type touch display panel according to the embodiment of the present disclosure may further comprises, before or after forming a pattern of self-capacitance touch electrodes in a matrix on a base substrate, forming a pattern of a gate electrode, a gate line and a connection line through one time patterning process.

Specifically, in the method of manufacturing the above self-capacitance type touch display panel according to an embodiment of the present disclosure, a pattern of a gate electrode, a gate line and a connection line may be formed through one time patterning process before forming the pattern of self-capacitance touch electrodes arranged in a matrix on the base substrate; or the pattern of a gate electrode, a gate line and a connection line may be formed through one time patterning process after forming the pattern of self-capacitance touch electrodes arranged in a matrix on the base substrate. In an example, the self-capacitance touch electrode is located on the base substrate and may be arranged in the same layer as the gate electrode. The common electrode is generally made of an ITO material, while the gate electrode is generally made of a metal material such as copper, aluminum or the like. Thus, the self-capacitance touch electrode and the gate electrode could not be formed by using the same one time patterning process although they are formed in the same layer, while the connection lines connecting the plurality of common electrodes of each row of common electrodes of each self-capacitance touch electrode and the gate electrode may be formed by using the same one time patterning process, which may simplify manufacturing processes and reduce production costs.

When being particularly implemented, the method of manufacturing the above self-capacitance type touch display panel according to the embodiment of the present disclosure may further comprises, before or after forming a pattern of self-capacitance touch electrodes arranged in a matrix on a base substrate, forming a pattern of a gate electrode, a gate line, a connection line and a second metal layer through one time patterning process.

Specifically, in the method of manufacturing the above self-capacitance type touch display panel according to the embodiment of the present disclosure, a pattern of a gate electrode, a gate line, a connection line and a second metal layer may be formed through one time patterning process before forming the pattern of self-capacitance touch electrodes arranged in a matrix on the base substrate; or the pattern of a gate electrode, a gate line, a connection line and a second metal layer may be formed through one time patterning process after forming the pattern of self-capacitance touch electrodes arranged in a matrix on the base substrate. In an example, the self-capacitance touch electrode is located on the base substrate and may be arranged in the same layer as the gate electrode. The common electrode is generally made of an ITO material, while the gate electrode is generally made of a metal material, such as copper, aluminum or the like. Thus, the self-capacitance touch electrode and the gate electrode could not be formed by using the same one time patterning process although they are formed in the same layer, while the connection lines connecting the plurality of common electrodes of each row of common electrodes of each self-capacitance touch electrode and the gate electrode may be formed by using the same one time patterning process, and the second metal layer, which is arranged to be connected in parallel with the first metal layer in order to increase the driving frequency for the touch display panel, may be formed by using the same one time patterning process as the gate electrode, which may simplify manufacturing processes and reduce production costs.

When being particularly implemented, in the method of manufacturing the above self-capacitance type touch display panel according to the embodiment of the present disclosure, forming a pattern of first metal layer on the base substrate formed with the pattern of self-capacitance touch electrodes may particularly comprises: forming a pattern of source/drain electrode layer on the base substrate formed with the pattern of first metal layer; or forming the pattern of the first metal layer on the base substrate formed with the pattern of source/drain electrode layer.

Specifically, in the method of manufacturing the above self-capacitance type touch display panel according to the embodiment of the present disclosure, since the first metal layer may be provided between and insulated from the gate electrode metal layer and the source/drain electrode layer, a pattern of a gate insulating layer may be formed on the base substrate formed with the pattern of gate electrode, then the pattern of a first metal layer may be formed on the base substrate formed with the pattern of the gate insulating layer pattern, and a pattern of an insulating layer is formed on the base substrate formed with the pattern of the first metal layer; furthermore, a pattern of an active layer and a source/drain electrode layer is formed on the base substrate formed with the pattern of the insulating layer; or the first metal layer is arranged above and insulated from the source/drain electrode layer. That is, the pattern of the insulating layer is formed on the base substrate formed with the pattern of source/drain electrode layer, and then the pattern of the first metal layer is formed on the base substrate formed with the pattern of the insulating layer, which is not limited herein.

When being particularly implemented, the method of manufacturing the above self-capacitance type touch display panel according to the embodiment of the present disclosure may further comprise forming a pattern including a passivation layer and a pixel electrode on the base substrate formed with the pattern of first metal layer.

Specifically, in order to achieve display and touch functions of the touch display panel, the processes of manufacturing the touch display panel further comprise manufacturing some necessary functional layers such as a passivation layer, a pixel electrode layer and the like. The method of manufacturing the above self-capacitance type touch display panel according to the embodiment of the present disclosure, may further comprise, after forming the first metal layer, forming a pattern including a passivation layer and a pixel electrode on the base substrate formed with the pattern of first metal layer, by using the same process and having the same layer structure as in prior arts, which will not be described in detail.

Figure 6:
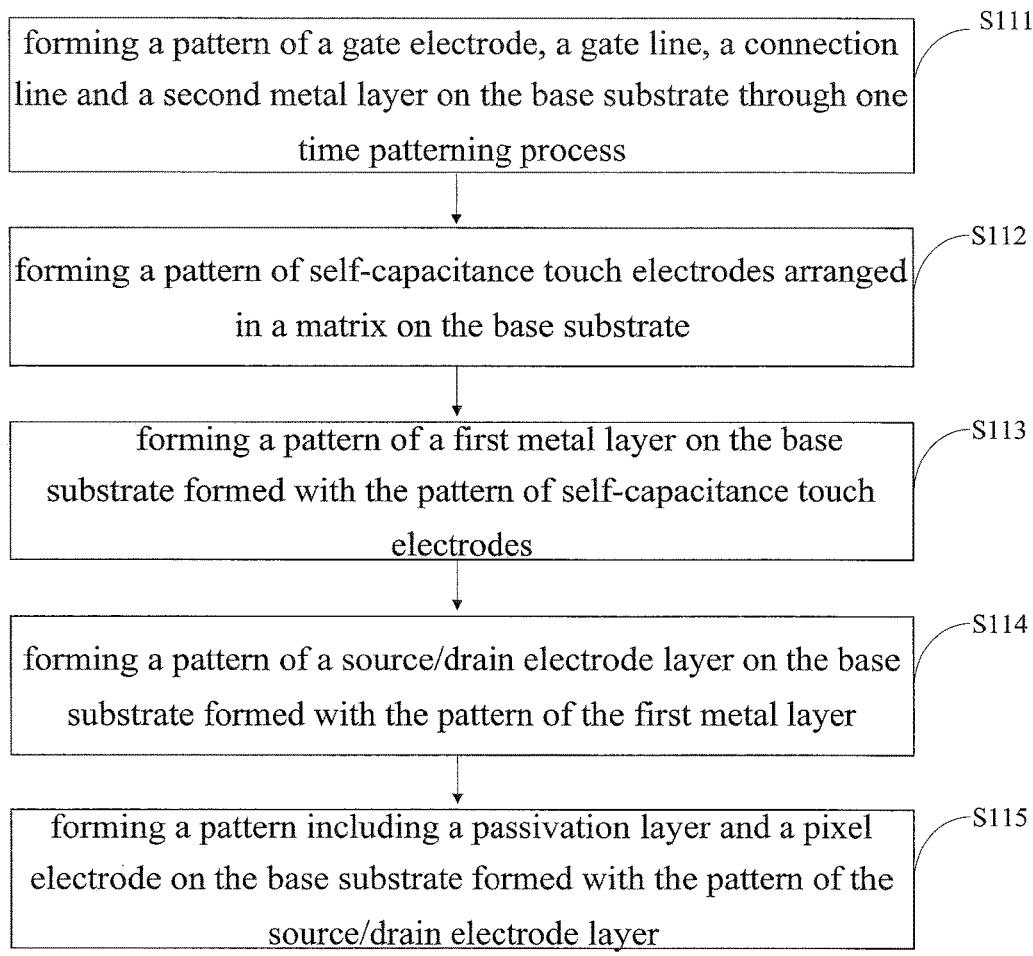
FIG. 6 is a flow chart showing specific steps of a method of manufacturing the self-capacitance type touch display panel according to an embodiment of the present disclosure.

Specifically, with description of the above embodiments, a method of manufacturing the above self-capacitance type touch display panel provided according to embodiments of the present disclosure, as shown in FIG. 6, may particularly comprise steps of:

S111: forming a pattern of a gate electrode, a gate line, a connection line and a second metal layer on the base substrate through one time patterning process;

S112: forming a pattern of self-capacitance touch electrode arranged in a matrix on the base substrate;

S113: forming a pattern of first metal layer on the base substrate formed with the pattern of self-capacitance touch electrodes;

S114: forming a pattern of source/drain electrode layer on the base substrate formed with the pattern of first metal layer; and S115: forming a pattern including a passivation layer and a pixel electrode on the base substrate formed with the pattern of source/drain electrode layer.

In an example, sequence of the above process steps may be varied, which has been described in detail in the above embodiments and will not be repeatedly described here.

Figure 7:
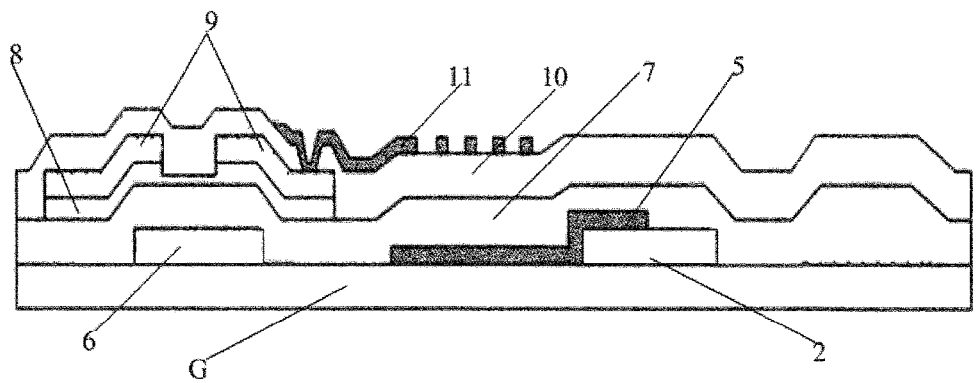
FIG. 7 is a structural schematic diagram of another example of an array substrate of a self-capacitance type touch display panel according to an embodiment of the present disclosure.

The whole layered structure of the self-capacitance type touch display panel formed by the above method is shown in FIG. 7, wherein a gate electrode 6 and a common electrode 2 (i.e., self-capacitance touch electrode) are located in the same layer on a base substrate G, the common electrode 2 contacts a connection line 5, a gate insulating layer 7 is located on the gate electrode 6 and the common electrode 2, an active layer 8 and source/drain electrodes 9 are located on the gate insulating layer 7, a first metal layer (not shown in the figure) where a touch lead wire 3 is provided may be arranged between the gate insulating layer 7 and the active layer 8, a passivation layer 10 is located on the active layer 8 and the source/drain electrodes 9, and a pixel electrode 11 is located on the passivation layer 10. The above is only described as a particular example of the structure of the self-capacitance type touch display panel, however the structure of the self-capacitance type touch display panel is not limited to the above in actual production and application, and the layered structure may be increased or reduced according to actual requirements of production so as to be applicable in various types of display panels, which will not be limited herein.

Figure 8:
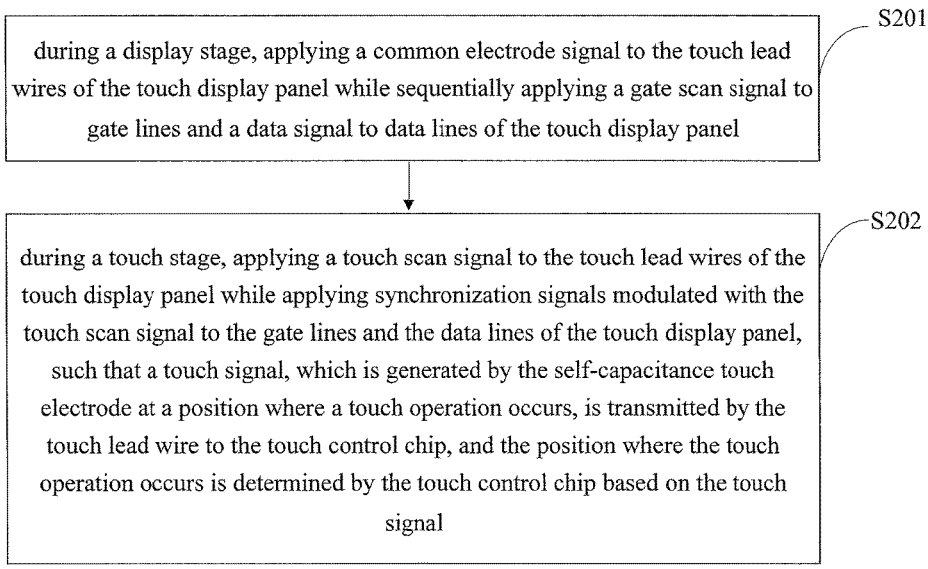
FIG. 8 is a flow chart showing a method of driving the self-capacitance type touch display panel according to an embodiment of the present disclosure.

Based on the same inventive concept, an embodiment of the present disclosure provides a method of driving the above self-capacitance type touch display panel according to embodiments of the present disclosure; as shown in FIG. 8, the method may particularly comprise steps of:

S201: during a display stage, applying a common electrode signal to the touch lead wires of the touch display panel while sequentially applying a gate scan signal to gate lines and a data signal to data lines of the touch display panel; and S202: during a touch stage, applying a touch scan signal to the touch lead wires of the touch display panel while applying synchronization signals modulated with the touch scan signal to the gate line and the data line of the touch display panel, such that a touch signal, which is generated by the self-capacitance touch electrode at a position where a touch operation occurs, is transmitted by the touch lead wire to the touch control chip, and the position where the touch operation occurs is determined by the touch control chip based on the touch signal.

In the method of driving the above self-capacitance type touch display panel according to the embodiment of the present disclosure, the display panel is driven respectively during the display stage and the touch stage so as to achieve a display function and a touch function. Thus, a time-sharing driving mode may be applied for the touch and display stages, where the common electrode is reused as a self-capacitance touch electrode, such that a common electrode signal is applied to the touch lead wire and thus is provided to the common electrode during the display stage, and during the touch stage, a touch scan signal is applied to the touch lead wire so as to drive the touch display panel to perform touch scanning operation while synchronization signals which are modulated with the touch scan signal are applied to the gate line and the data line so as to reduce parasitic capacitance and thereby RC delay between the self-capacitance touch electrode and other electrode line(s); further, a touch signal which is generated at a position where a touch operation occurs is transmitted by the touch lead wire to the touch control chip, such that the position where the touch operation occurs is determined by the touch control chip based on the touch signal. As such, the self-capacitance type In-Cell touch technology is combined in the existing large-sized display panel so as to achieve excellent display and touch experiences of the large-sized display panel with low cost; moreover, the common electrode is arranged in a region defined between adjacent gate lines and data lines, such that the common electrode will not overlap the gate lines and the data lines, and parasitic capacitance between the self-capacitance touch electrode and other signal line(s) is very small during the touch stage, which will facilitate improvement of touch control performance.

Figure 9:
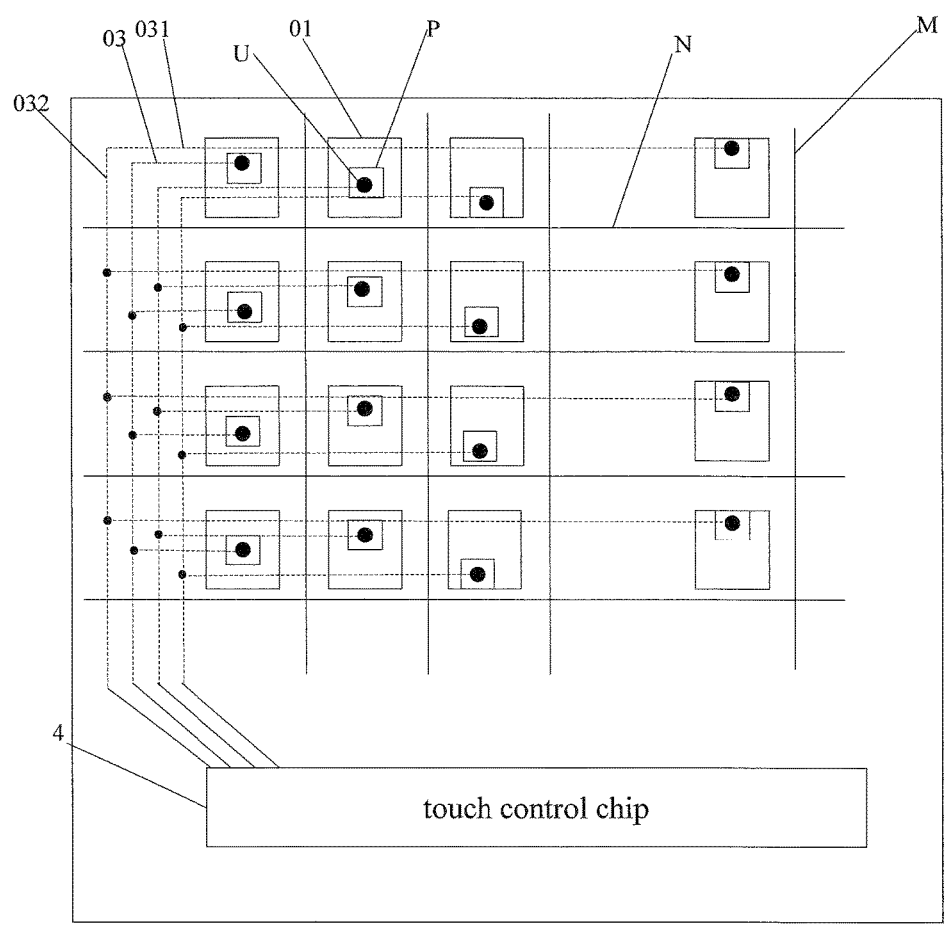
FIG. 9 is a first structural schematic diagram of an array substrate of a mutual-capacitance type touch display panel according to one embodiment of the present disclosure.
Figure 10:
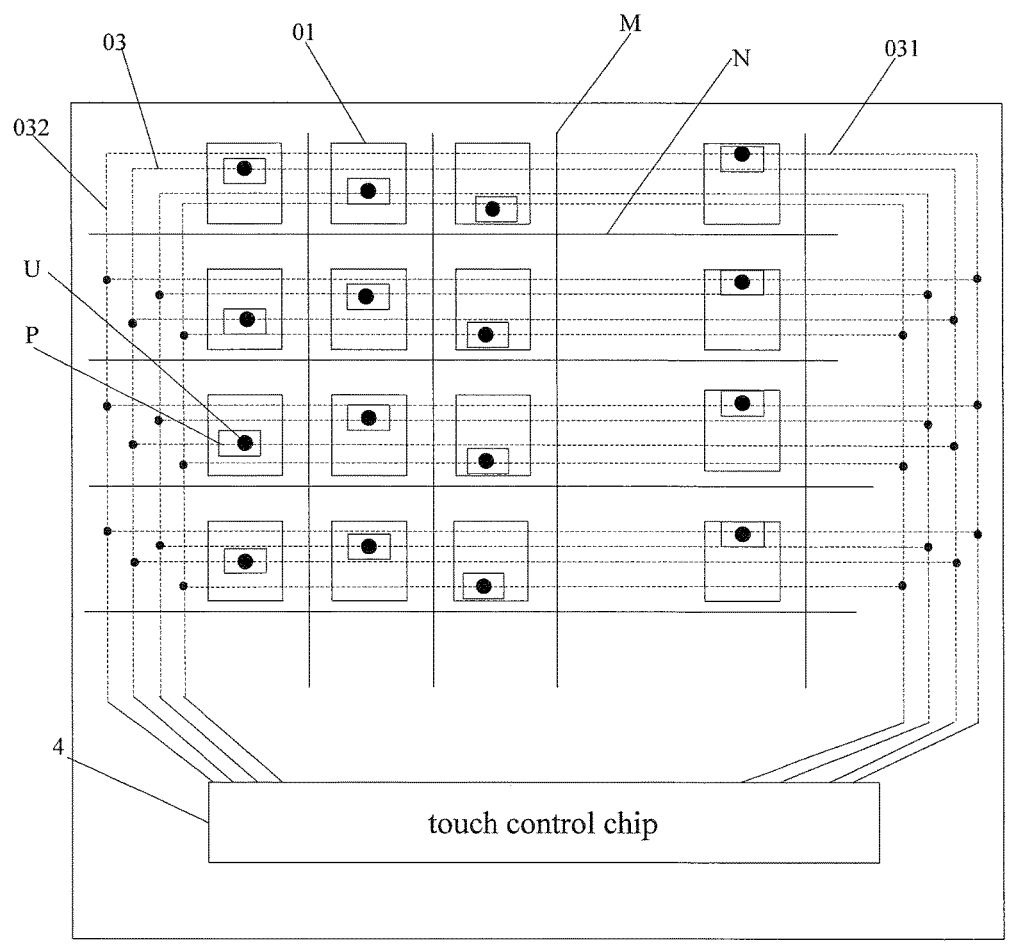
FIG. 10 is a second structural schematic diagram of an array substrate of the mutual-capacitance type touch display panel according to one embodiment of the present disclosure.

Based on the same inventive concept, an embodiment of the present disclosure provides a mutual-capacitance type touch display panel; as shown in FIG. 9 and FIG. 10, the mutual-capacitance type touch display panel may comprise: an array substrate provided with a first metal layer and touch driving electrodes 01 arranged in a matrix, a touch control chip 4 and a color filter substrate provided with touch sensing electrodes.

Figure 11:
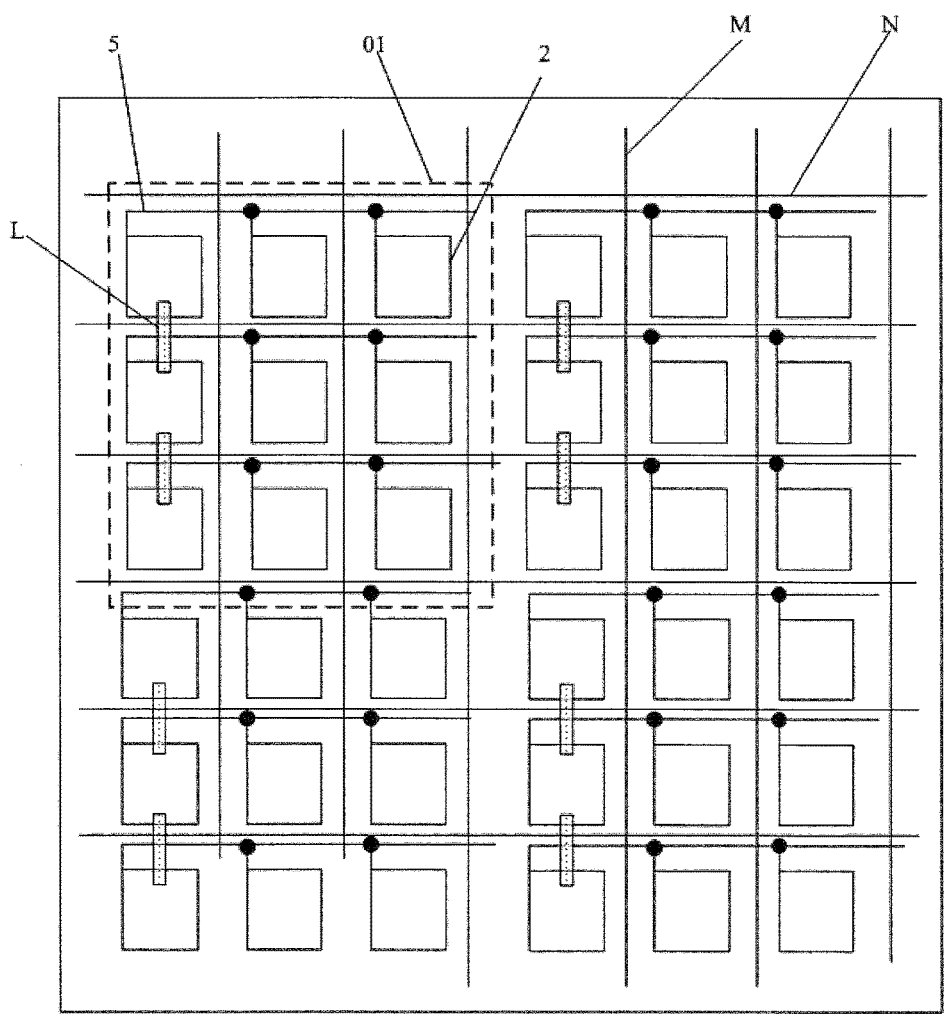
FIG. 11 is a structural schematic diagram of a touch driving electrode of the mutual-capacitance type touch display panel according to an embodiment of the present disclosure.

As shown in FIG. 11, the touch driving electrode 01 comprises a plurality of common electrodes 2. As shown in FIG. 9 and FIG. 10, the first metal layer comprises a plurality of touch driving lead wires 03 corresponding to respective columns of touch driving electrodes 01 one to one, each column of touch driving electrodes 01 being connected with the touch control chip 4 via a corresponding touch driving lead wire 03.

The touch driving lead wire 03 is configured to transmit a common electrode signal to the touch driving electrode 01 during a display stage and to transmit a touch scan signal to the touch driving electrode 01 during a touch stage, the touch sensing electrode is configured to couple the touch scan signal and output the coupled touch signal to the touch control chip 4, and the touch control chip 4 is configured to determine a position where a touch operation occurs based on the touch signal.

The above mutual-capacitance type touch display panel according to the embodiment of the present disclosure may comprise an array substrate provided with a first metal layer and touch driving electrodes 01 arranged in a matrix; wherein the touch driving electrode 01 comprises a plurality of common electrodes 2, and the first metal layer comprises a plurality of touch driving lead wires 03 corresponding to respective columns of touch driving electrodes 01 one to one, each column of touch driving electrodes 01 being connected with the touch control chip 4 via a corresponding touch driving lead wire 03; the touch driving lead wire 03 is configured to transmit a common electrode signal to the touch driving electrode 01 during a display stage and to transmit a touch scan signal to the touch driving electrode 01 during a touch stage, the touch sensing electrode is configured to couple the touch scan signal and output the coupled touch signal to the touch control chip 4, and the touch control chip 4 is configured to determine a position where a touch operation occurs based on the touch signal. With such mutual-capacitance type touch display panel, the common electrode is reused as a touch driving electrode during a touch stage; the first metal layer is separately provided, the touch lead wires are provided in the first metal layer, respective columns of touch driving electrodes are connected with the touch control chip via corresponding touch lead wires, thereby enabling a touch function. Compared to prior arts in which the touch lead wire is provided in peripheral region of the display panel so as to provide the touch function, the mutual-capacitance type touch display panel according to the embodiment of the present disclosure is provided with the separate first metal layer, such that the touch driving lead wire may be arranged above an existing peripheral circuit pattern, which needs no more space in the frame region relative to prior arts and thus facilitate a narrow frame design; meanwhile, the common electrode can be reused as the touch driving electrode, which, together with the touch sensing electrode, form a mutual-capacitance so as to achieve a touch function. As shown in FIG. 11, the common electrode 2 is arranged in a region defined between adjacent gate lines N and data lines M, such that the common electrode 2 will not overlap the gate lines N and the data lines M, and parasitic capacitance between the touch driving electrode and other signal lines is very small during the touch stage, which may ensure that there is sufficient time for touch driving scan and will facilitate touch driving scan and sensing, thereby facilitating improvement of touch control performance.

Figure 12:
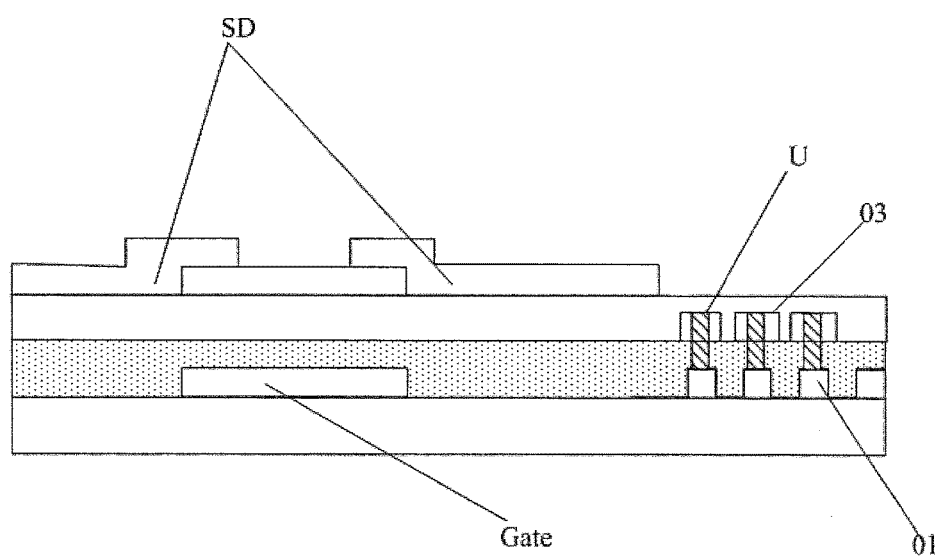
FIG. 12 is a cross sectional view of an array substrate of the mutual-capacitance type touch display panel according to an embodiment of the present disclosure.

When being particularly implemented, in the above mutual-capacitance type touch display panel according to the embodiment of the present disclosure, in order to achieve a touch function of the mutual-capacitance type touch display panel during a touch stage, the first metal layer is separately provided, and thereby the touch driving lead wires are provided in the first metal layer. As such, compared to prior arts in which the edge frame region of the display panel is increased such that the touch driving lead wire is provided therein, the touch display panel according to the embodiment of the present disclosure is provided with the separate first metal layer in which the touch driving lead wires are provided, thereby a narrow frame design can be achieved for the touch display panel. As shown in FIG. 12, when a gate electrode metal layer Gate is arranged immediately adjacent to a base substrate of the array substrate, the first metal layer in which the touch driving lead wires are provided (or where the touch driving lead wire 03 are located) is located between the gate electrode metal layer Gate and a source/drain electrode layer SD, and these three layers are insulated from one another. In an example, a via hole U is provided at a position at which the touch driving lead wire 03 is connected with the touch driving electrode 01, for providing electrical connection between the touch driving electrode 01 and the touch driving lead wire 03. The first metal layer may be also located above and insulated from the source/drain electrode layer, so as to provide the connection between the touch driving lead wire and the touch driving electrode. The touch driving lead wires can be provided in the first metal layer by any of the two above described ways; of course, the position where the first metal layer is located may be adjusted according to actual production processes and product requirements so as to provide the touch function, which will not be limited herein.

When being particularly implemented, in the above mutual-capacitance type touch display panel according to the embodiment of the present disclosure, in order to connect respective touch driving electrodes to the touch control chip so as to achieve the touch function of the touch display panel during the touch stage, respective columns of touch driving electrodes are connected with the touch control chip by corresponding touch driving lead wires in an one to one way; since the touch driving electrodes are arranged in a matrix as shown in FIGS. 9 and 10, the touch driving lead wire 03 comprises a first portion 031 extending in a direction of the gate line N and a second portion 032 extending in a direction of the data line M. As such, the touch driving lead wires 03 correspond to the respective touch driving electrodes 1 one to one, such that the first portions 031 extending in the direction of the gate line N are connected with the respective touch driving electrodes 1, and the second portions 032 extending in the direction of the data line M are connected with the touch control chip 4; in this connection way, the touch control chip is located in the extending direction of the data line. Alternatively, the second portions extending in the direction of the data line may be connected with the respective touch driving electrodes, and the first portions extending in the direction of the gate line are connected to the touch control chip; in this connection way, the touch control chip is located in the extending direction of the gate line. These are not limited herein.

When being particularly implemented, in the above mutual-capacitance type touch display panel according to the embodiment of the present disclosure, as shown in FIGS. 9 and 10, the first metal layer comprises: a plurality of pedestals P corresponding to the touch driving electrodes 01 one to one; and the pedestal P is provided therein with the via hole U, via which the touch driving electrode 01 is connected with the corresponding touch driving lead wire 03. In FIG. 9, the first metal layer comprises a set of touch driving lead wires at the left side of the figure; and in FIG. 10, the first metal layer comprises two sets of touch driving lead wires which are arranged in bilateral symmetry way.

Specifically, in the above mutual-capacitance type touch display panel according to the embodiment of the present disclosure, in order to achieve the connection between the touch driving electrode 01 and the touch driving lead wire 03, the via hole connection is provided between the touch driving electrode 01 and the touch driving lead wire 03. In order to facilitate implementation of processes for forming the via hole, pedestals P may be provided on the first metal layer to correspond to the touch driving electrodes 01 one to one, such that implementation of the processes for forming the via hole may be facilitated at the position of the pedestal P, and therefore it will facilitate to achieve a good electrical connection of the touch driving electrode with the touch driving lead wire.

When being particularly implemented, in the above mutual-capacitance type touch display panel according to the embodiment of the present disclosure, as shown in FIG. 11, the plurality of common electrodes 2 of the touch driving electrode 01 is arranged in a matrix, a plurality of the common electrodes 2 of each row of common electrodes of each touch driving electrode 01 are connected with one another via connection lines 5, and common electrodes 2 of each touch driving electrode 01 located in adjacent rows and in the same column are connected with one another via jumpers L in the first metal layer or via jumpers L in a pixel electrode layer.

Specifically, in the above mutual-capacitance type touch display panel according to the embodiment of the present disclosure, the common electrode is reused as the touch driving electrode so as to provide the touch function during the touch stage. In an example, the common electrode is located on the base substrate of the array substrate and in the same layer as the gate electrode, and each touch driving electrode comprises a plurality of the common electrodes. In order to achieve the touch function of the touch driving electrode, it is required to connect a plurality of the common electrodes of each touch driving electrode together to form a complete touch driving electrode, so that the touch function of the mutual-capacitance touch electrode can be achieved. Generally, the plurality of common electrodes of each touch driving electrode may be arranged in a matrix, thus a plurality of common electrodes of each row of common electrodes of each touch driving electrode may be connected with one another via connection lines, and common electrodes of each touch driving electrode located in adjacent rows may be connected with one another via jumpers in the first metal layer or via jumpers in a pixel electrode layer. As such, an existing metal layer, for example, the first metal layer or pixel electrode layer, of the array substrate may be utilized; of course, other metal layer in which jumpers may be provided to connect the common electrodes in adjacent rows may be used such that the common electrodes in adjacent rows may be connected with one another via the jumpers provided in the other metal layer and are prevented from crossing the gate lines to form short circuit, thus respective common electrodes of one touch driving electrode are connected into a whole, thereby the touch function of the touch driving electrode can be achieved, and meanwhile, the existing metal layer is used to provide the jumpers, which may simplify processes of manufacturing the array substrate and arrangement of layers and reduce production cost.

When being particularly implemented, in the above mutual-capacitance type touch display panel according to the embodiment of the present disclosure, the connection lines connecting the plurality of common electrodes of each row of common electrodes of each touch driving electrode are located in the same layer as the gate line and in parallel with each other.

Specifically, in the above mutual-capacitance type touch display panel according to the embodiment of the present disclosure, the common electrodes may be located in the same layer as a gate electrode on the base substrate, thus the connection lines connecting the plurality of common electrodes of each row of common electrodes of each touch driving electrode may be located in the same layer as the gate line and in parallel with each other. As such, the gate electrode, the gate line and the connection line may be formed through one time patterning process during manufacturing the array substrate, which may simplify the processes of manufacturing the array substrate and reduce production cost.

When being particularly implemented, the above mutual-capacitance type touch display panel according to an embodiment of the present disclosure may further comprise a second metal layer, which is located in the same layer as the gate electrode metal layer and is arranged in parallel connection with the first metal layer.

Specifically, in the above mutual-capacitance type touch display panel according to the embodiment of the present disclosure, the resistance of the touch driving lead wire in the first metal layer may be further reduced in order to increase a driving frequency for the touch display panel; that is, the second metal layer is provided in the metal layer of the gate electrode in a pattern including a plurality of common electrodes, and is arranged in parallel with the touch driving lead wire in the first metal layer, such that the common electrode and the gate electrode in the second metal layer may be formed through one time patterning process, and the common electrodes in the second metal layer are connected with the touch driving lead wires in the first metal layer via the via hole at a corresponding position so as to form a parallel arrangement. As such, a parallel arrangement of the first metal layer and the second metal layer may be achieved, thereby the resistance of the first metal layer may be reduced, and the touch driving frequency for the touch display panel may be increased by about 30%.

When being particularly implemented, in the above mutual-capacitance type touch display panel according to the embodiment of the present disclosure, in order to increase a driving frequency for the touch display panel, the first metal layer comprises two sets of touch driving lead wires 03 arranged in a bilateral symmetry way, each column of touch driving electrodes 01 corresponding to two touch driving lead wires 03, as shown in FIG. 10. As such, the touch display panel may be double-sides driven during the touch stage, thereby the touch scan frequency may be increased, further improving the touch control performance.

Figure 13:
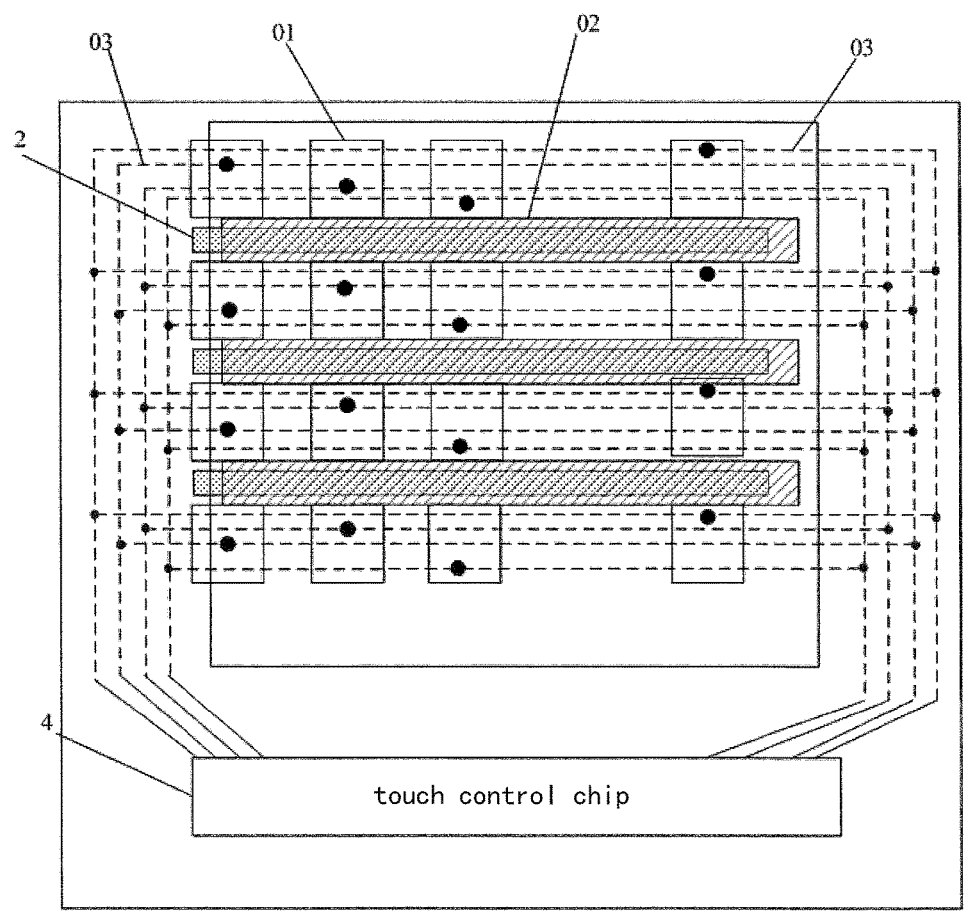
FIG. 13 is a structural schematic diagram of the mutual-capacitance type touch display panel according to an embodiment of the present disclosure.
Figure 14:
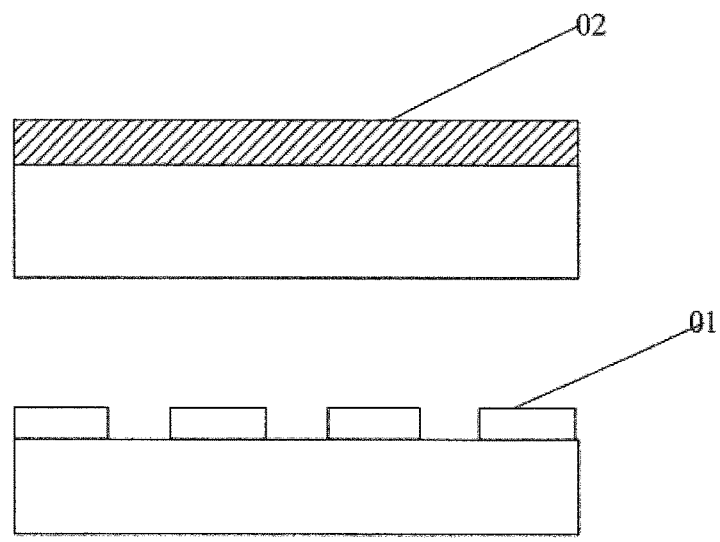
FIG. 14 is a structural schematic diagram showing operation principle of the mutual-capacitance type touch display panel according to an embodiment of the present disclosure.

When being particularly implemented, in the above mutual-capacitance type touch display panel according to the embodiment of the present disclosure, as shown in FIG. 13, a column of touch driving electrodes 01 are connected with the same one touch driving lead wire 03, such that the touch driving scan can be performed in unit of column; the common electrode 2 is arranged between two adjacent rows of touch driving electrodes 01, and the touch sensing electrode 02 on the color filter substrate is arranged to correspond to and in parallel with the common electrode 2, such that a mutual-capacitance is formed between the touch sensing electrode 02 arranged transversely and the columns of the touch driving electrodes arranged longitudinally so as to enable the touch function. In an example, there is no overlap between the touch sensing electrode 02 and the touch driving electrode 01, so that the parasitic capacitance between them is very small, and a change in the mutual-capacitance between the touch sensing electrode and the touch driving electrode is relatively apparent when a touch operation occurs and thus a touch signal generated at a position where the touch operation occurs can be easily detected, thereby the position where the touch operation occurs can be easily detected and determined. Specifically, as shown in FIG. 14, the mutual-capacitance type touch display panel comprises an array substrate provided with the touch driving electrode 01 and a color filter substrate provided with the touch sensing electrode 02, and a mutual-capacitance will be formed between the touch sensing electrode 02 arranged transversely and columns of the touch driving electrodes arranged longitudinally so as to enable the touch function.

Figure 15:
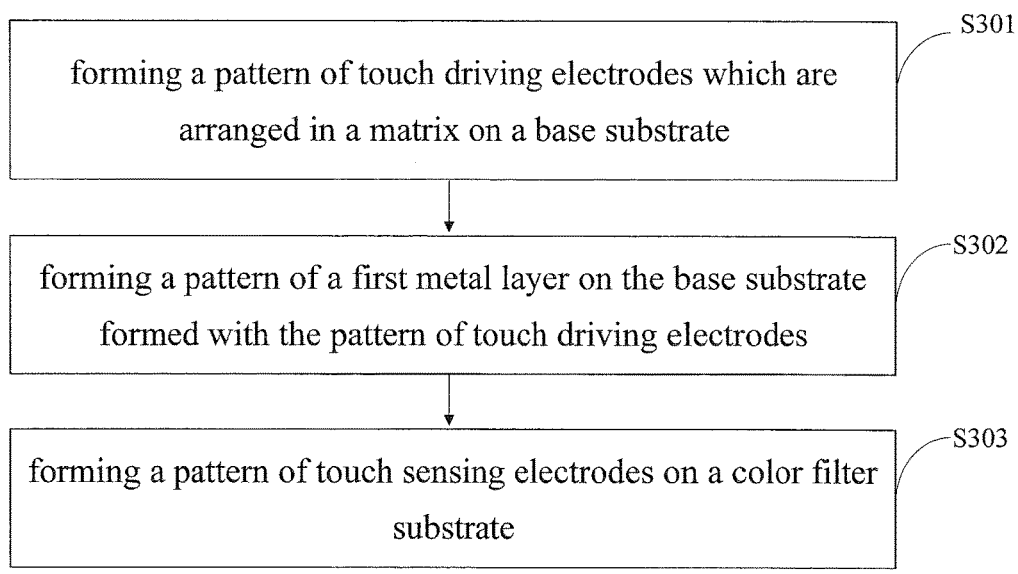
FIG. 15 is a flow chart showing a method of manufacturing the mutual-capacitance type touch display panel according to an embodiment of the present disclosure.

Based on the same inventive concept, an embodiment of the present disclosure provides a method of manufacturing the above mutual-capacitance type touch display panel according to embodiments of the present disclosure; as shown in FIG. 15, the method may particularly comprise steps of:

S301: forming a pattern of touch driving electrodes which are arranged in a matrix on a base substrate, each touch driving electrode comprising a plurality of common electrodes;

S302: forming a pattern of first metal layer on the base substrate formed with the pattern of touch driving electrodes;

wherein the formed first metal layer comprises a plurality of touch driving lead wires corresponding to respective columns of touch driving electrodes one to one, and each column of touch driving electrodes are connected with the touch control chip via a corresponding touch driving lead wire; and S303: forming a pattern of touch sensing electrodes on a color filter substrate;

wherein the touch driving lead wire is configured to transmit a common electrode signal to the touch driving electrode during a display stage, and the touch driving lead wire is further configured to transmit a touch scan signal to the touch driving electrode during a touch stage, the touch sensing electrode is configured to couple the touch scan signal and output the coupled touch signal to the touch control chip, and the touch control chip is configured to determine a position where a touch operation occurs based on the touch signal.

In the method of manufacturing the above mutual-capacitance type touch display panel according to the embodiment of the present disclosure, a pattern of touch driving electrodes which are arranged in a matrix is formed on a base substrate, each formed touch driving electrode comprises a plurality of common electrodes; then a pattern of first metal layer is formed on the base substrate formed with the pattern of touch driving electrodes, the formed first metal layer comprises a plurality of touch driving lead wires corresponding to respective columns of touch driving electrodes one to one, and each column of touch driving electrodes are connected with the touch control chip via a corresponding touch driving lead wire; that is, the first metal layer is separately provided, the touch lead wires are provided in the first metal layer, and respective columns of touch driving electrode are connected with the touch control chip via corresponding touch lead wires, thereby enabling a touch function. Compared to prior arts in which the touch lead wire is provided in a peripheral region of the display panel so as to provide the touch function, the mutual-capacitance type touch display panel provided according to the embodiment of the present disclosure is provided with the separate first metal layer, such that the touch driving lead wire may be arranged above an existing peripheral circuit pattern, which needs no more space in the edge frame region relative to prior arts and thus facilitate a narrow frame design, and meanwhile, the common electrode can be reused as the touch driving electrode; the common electrode is arranged in a region defined between adjacent gate lines and data lines, such that the common electrode will not overlap the gate lines and the data lines, and parasitic capacitance between the touch driving electrode and other signal lines is very small during the touch stage, which may ensure that there is sufficient time for touch driving scan and will facilitate touch driving scan and sensing, thereby facilitating improvement of touch control performance.

When being particularly implemented, the method of manufacturing the above mutual-capacitance type touch display panel according to the embodiment of the present disclosure may further comprises, before or after forming a pattern of touch driving electrodes which are arranged in a matrix on a base substrate, forming a pattern of a gate electrode, a gate line and a connection line through one time patterning process.

Specifically, in the method of manufacturing the above mutual-capacitance type touch display panel according to the embodiment of the present disclosure, a pattern of a gate electrode, a gate line and a connection line may be formed through one time patterning process before forming the pattern of touch driving electrodes in a matrix on the base substrate; or the pattern of a gate electrode, a gate line and a connection line may be formed through one time patterning process after forming the pattern of touch driving electrodes in a matrix on the base substrate. In an example, the touch driving electrodes are located on the base substrate and may be arranged in the same layer as the gate electrode. The common electrode is generally made of an ITO material, while the gate electrode is generally made of a metal material such as copper, aluminum or the like. due to this, the touch driving electrodes and the gate electrode could not be formed by using the same one time patterning process although they are formed in the same layer, while the connection lines connecting the plurality of common electrodes of each row of common electrodes of each touch driving electrode and the gate electrode may be formed by using the same patterning process, which may simplify manufacturing processes and reduce production costs.

When being particularly implemented, the method of manufacturing the above mutual-capacitance type touch display panel according to the embodiment of the present disclosure may further comprises, before or after forming a pattern of touch driving electrodes in a matrix on a base substrate, forming a pattern of a gate electrode, a gate line, a connection line and a second metal layer through one time patterning process.

Specifically, in the method of manufacturing the above mutual-capacitance type touch display panel according to the embodiment of the present disclosure, a pattern of a gate electrode, a gate line, a connection line and a second metal layer may be formed through one time patterning process before forming the pattern of touch driving electrodes in a matrix on the base substrate; or the pattern of a gate electrode, a gate line, a connection line and a second metal layer may be formed through one time patterning process after forming the pattern of touch driving electrodes in a matrix on the base substrate. In an example, the touch driving electrode is located on the base substrate and may be arranged in the same layer as the gate electrode. The common electrode is generally made of an ITO material, while the gate electrode is generally made of a metal material, such as copper, aluminum or the like. Thus, the touch driving electrode and the gate electrode could not be formed by using the same one time patterning process although they are formed in the same layer, while the connection lines connecting the plurality of common electrodes of each row of common electrodes of each touch driving electrode and the gate electrode may be formed by using the same one time patterning process, and the second metal layer, which is arranged to be connected in parallel with the first metal layer in order to increase the driving frequency for the touch display panel, may be formed by using the same one time patterning process as the gate electrode, which may simplify manufacturing processes and reduce production costs.

When being particularly implemented, in the method of manufacturing the above mutual-capacitance type touch display panel according to the embodiment of the present disclosure, forming a pattern of first metal layer on the base substrate formed with the pattern of touch driving electrodes may particularly comprises: forming a pattern of source/drain electrode layer on the base substrate formed with the pattern of first metal layer; or forming the pattern of the first metal layer on the base substrate formed with the pattern of source/drain electrode layer.

Specifically, in the method of manufacturing the above mutual-capacitance type touch display panel according to the embodiment of the present disclosure, since the first metal layer may be provided between and insulated from the gate electrode metal layer and the source/drain electrode layer, a pattern of a gate insulating layer may be formed on the base substrate formed with the pattern of gate electrode, then a pattern of a first metal layer may be formed on the base substrate formed with the pattern of the gate insulating layer pattern, and a pattern of an insulating layer is formed on the base substrate formed with the pattern of the first metal layer; furthermore, a pattern including an active layer and a source/drain electrode layer is formed on the base substrate formed with the pattern of the insulating layer, or the first metal layer is arranged above and insulated from the source/drain electrode layer. That is, the pattern of the insulating layer is formed on the base substrate formed with the pattern of source/drain electrode layer, and then the pattern of the first metal layer is formed on the base substrate formed with the pattern of the insulating layer, which is not limited herein.

When being particularly implemented, the method of manufacturing the above mutual-capacitance type touch display panel according to the embodiment of the present disclosure may further comprise forming a pattern including a passivation layer and a pixel electrode on the base substrate formed with the pattern of the first metal layer.

Specifically, in order to achieve display and touch functions of the touch display panel, the processes of manufacturing the touch display panel further comprise manufacturing some necessary functional layers such as a passivation layer, a pixel electrode layer and the like. The method of manufacturing the above mutual-capacitance type touch display panel according to the embodiment of the present disclosure, may further comprise, forming a pattern including a passivation layer and a pixel electrode on the base substrate formed with the pattern of the first metal layer, by using the same process and having the same layer structure as in prior arts, which will not be described in detail.

Figure 16:
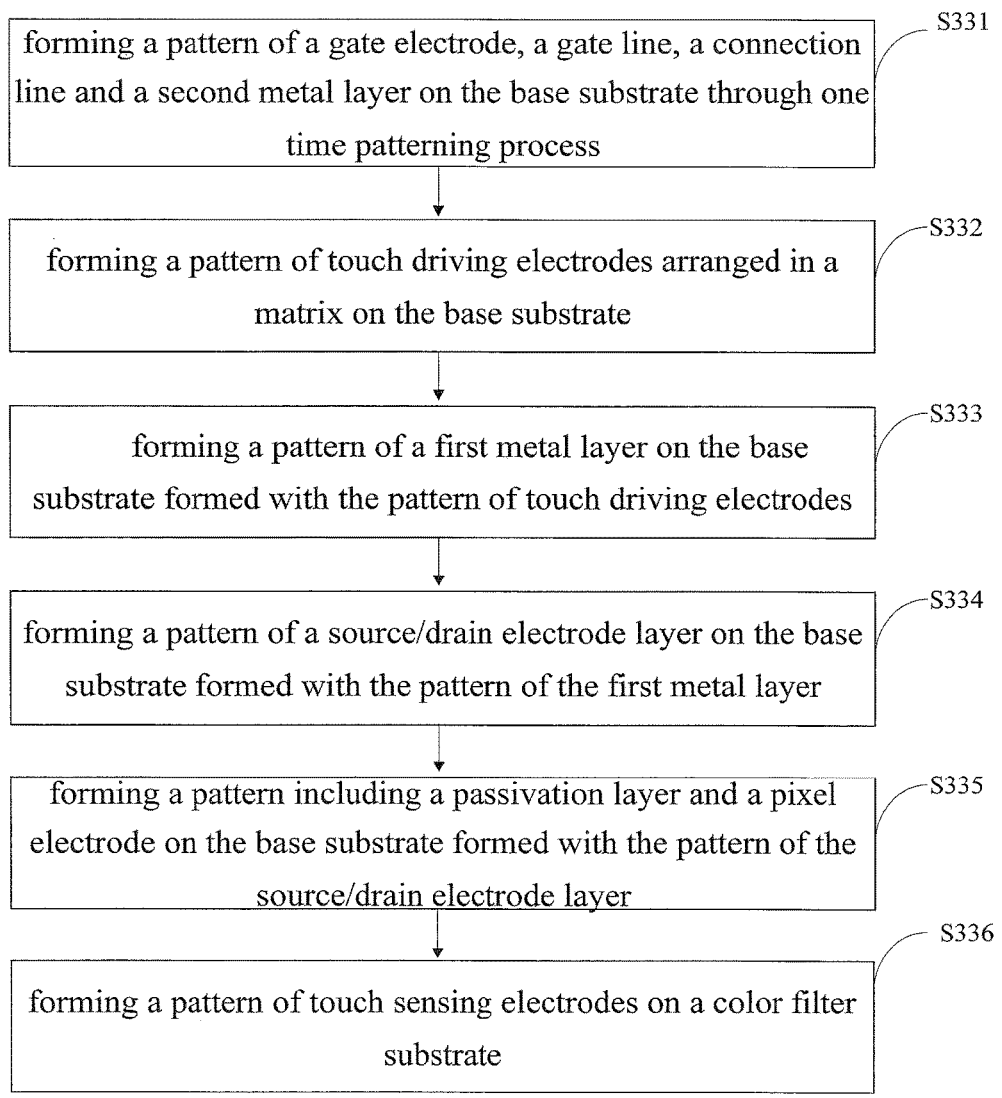
FIG. 16 is a flow chart showing specific steps of a method of manufacturing the mutual-capacitance type touch display panel according to an embodiment of the present disclosure.

Specifically, with description of the above embodiments, a method of manufacturing the above mutual-capacitance type touch display panel provided according to embodiments of the present disclosure, as shown in FIG. 16, may particularly comprise steps of:

S331: forming a pattern of a gate electrode, a gate line, a connection line and a second metal layer on the base substrate through one time patterning process;

S332: forming a pattern of a touch driving electrode arranged in a matrix on the base substrate;

S333: forming a pattern of a first metal layer on the base substrate formed with the pattern of touch driving electrodes;

S334: forming a pattern of a source/drain electrode layer on the base substrate formed with the pattern of the first metal layer;

S335: forming a pattern including a passivation layer and a pixel electrode on the base substrate formed with the pattern of the source/drain electrode layer; and S336: forming a pattern of touch sensing electrodes on a color filter substrate.

In an example, sequence of the above process steps may be varied, which has been described in detail in the above embodiments and will not be repeatedly described here.

The whole layered structure of the mutual-capacitance type touch display panel formed by the above manufacturing method is shown in FIG. 17, which only shows the structure of the array substrate provided with the touch driving electrodes, but does not show the structure of the color filter substrate provided with the touch sensing electrodes. Specifically, a gate electrode 6 and a common electrode 2 (i.e., touch driving electrode) are located in the same layer on a base substrate G, the common electrode 2 contacts a connection line 5, a gate insulating layer 7 is located on the gate electrode 6 and the common electrode 2, an active layer 8 and source/drain electrodes 9 are located on the gate insulating layer 7, a first metal layer (not shown in the figure) where a touch lead wire 03 is provided may be arranged between the gate insulating layer 7 and the active layer 8, a passivation layer 10 is located on the active layer 8 and the source/drain electrodes 9, and a pixel electrode 11 is located on the passivation layer 10. The above is only described as a particular example of the structure of the mutual-capacitance type touch display panel, however the structure of the mutual-capacitance type touch display panel is not limited to the above in actual production and application, and the layered structure may be increased or reduced according to actual requirements of production so as to be applicable in various types of display panels, which will not be limited herein.

Based on the same inventive concept, an embodiment of the present disclosure provides a method of driving the above mutual-capacitance type touch display panel according to embodiments of the present disclosure; as shown in FIG. 18, the method may particularly comprise steps of:

S401: during a display stage, applying a common electrode signal to the touch driving lead wires of the touch display panel while sequentially applying a gate scan signal to gate lines and a data signal to a data line of the touch display panel; and S402: during a touch stage, applying a touch scan signal to the touch driving lead wires of the touch display panel while applying synchronization signals modulated with the touch scan signal to the gate line and the data line of the touch display panel, such that the touch sensing electrode couples the touch scan signal and output the coupled touch signal to the touch control chip, and the touch control chip determines a position where a touch operation occurs based on the touch signal.

In the method of driving the above mutual-capacitance type touch display panel according to the embodiment of the present disclosure, the touch display panel is driven so as to achieve a display function and a touch function during the display stage and the touch stage respectively, that is, a time-sharing driving mode may be applied for the touch and display stages, wherein during the touch stage the common electrode is reused as a touch driving electrode, such that a common electrode signal is applied to the touch driving lead wire and thus is provided to the common electrode during the display stage, and during the touch stage, a touch scan signal is applied to the touch driving lead wire so as to drive the touch display panel to perform touch scanning operation while synchronization signals which are modulated with the touch scan signal are applied to the gate line and the data line so as to reduce parasitic capacitance and thereby RC delay between the touch driving electrode and other electrode line(s); further, the touch sensing electrode couples the touch scan signal and output the coupled touch signal to the touch control chip, and the touch control chip determines a position where a touch operation occurs based on the touch signal, thereby achieving the display function and the touch function of the touch display panel. Moreover, the common electrode is arranged in a region defined between adjacent gate lines and data lines, such that the common electrode will not overlap the gate lines and the data lines, and parasitic capacitance between the touch driving electrode and other signal line(s) is very small during the touch stage, which will facilitate improvement of touch control performance.

Based on the same inventive concept, an embodiment of the present disclosure provides a display device, comprising the above self-capacitance type touch display panel provided according to embodiments of the present disclosure or the above mutual-capacitance type touch display panel provided according to embodiments of the present disclosure. The display device may be applied in a mobile phone, a tablet PC, a TV set, a display, a notebook PC, a digital photo frame, a navigator or other product or part having a displaying function. The principle of the display device for solving the above problems is similar to that of the above self-capacitance type touch display panel or mutual-capacitance type touch display panel. Thus, implementation of the display device may refer to those of the above self-capacitance type touch display panel or mutual-capacitance type touch display panel, and will not be repeatedly described.

It is noted that, the common electrode described herein may also be called as a storage capacitor electrode for forming a liquid crystal capacitor. In one example, the storage capacitor electrode may be arranged in the same layer as the gate electrode, which is known in the field and thus will not be described in detail.

Embodiments of the present disclosure provide a touch display panel, a method of manufacturing the touch display panel, a method for driving the touch display panel, and a display device, and the touch display panel includes a self-capacitance type touch display panel or a mutual-capacitance type touch display panel. In the self-capacitance type touch display panel, the common electrode is reused as a self-capacitance touch electrode during a touch stage; a separate first metal layer is provided, touch lead wires are provided in the first metal layer, respective self-capacitance touch electrodes are connected with the touch control chip via the touch lead wires, thereby achieving a touch function. Correspondingly, in the mutual-capacitance type touch display panel, the common electrode is reused as a touch driving electrode during a touch stage; a separate first metal layer is provided, touch driving lead wires are provided in the first metal layer, such that the touch driving lead wire and a touch sensing electrode on a color filter substrate form mutual-capacitance so as to enable a touch function. Compared to prior arts in which the touch lead wire or touch driving lead wire is provided in the peripheral region of the display panel so as to provide the touch function, the touch display panel according to embodiments of the present disclosure is provided with a separate first metal layer, such that the touch lead wire or touch driving lead wire may be arranged above an existing peripheral circuit pattern, which needs no more space in the frame region relative to prior arts and thus facilitate a narrow frame design; meanwhile, the common electrode can be reused as the self-capacitance touch electrode or touch driving electrode, and the common electrode is located in a region defined between adjacent gate lines and data lines, such that the common electrode will not overlap the gate lines and the data lines, and parasitic capacitance between the self-capacitance touch electrode or touch driving electrode and other signal lines is very small during the touch stage, which will facilitate to improve touch control performance.

Obviously, various changes or modifications may be made to the present disclosure by those skilled in the art without departing from the principle and spirit of the disclosure. Thus, if the changes and modifications of the present disclosure fall within the scope of the present invention defined in the claims and their equivalents, the present invention is intended to include these changes and modifications.

What is claimed is:

1. A self-capacitance type touch display panel, comprising: an array substrate provided with a first metal layer and self-capacitance touch electrodes, and a touch control chip; wherein
   each of the self-capacitance touch electrodes comprises a plurality of common electrodes, the first metal layer comprises a plurality of touch lead wires corresponding to the respective self-capacitance touch electrodes one to one, and each of the self-capacitance touch electrodes is connected with the touch control chip via a corresponding touch lead wire;
   the touch lead wire is configured to transmit a common electrode signal to the self-capacitance touch electrode during a display stage, to transmit a touch scan signal to the self-capacitance touch electrode during a touch stage, and to transmit a touch signal, which is generated by the self-capacitance touch electrode at a position where a touch operation occurs, to the touch control chip,
   wherein if a gate electrode metal layer is arranged immediately adjacent to a base substrate of the array substrate,
   the first metal layer is located between the gate electrode metal layer and a source/drain electrode layer, and these three layers are insulated from one another; or
   the first metal layer is located above and insulated from the source/drain electrode layer.

2. The self-capacitance type touch display panel according to claim 1, wherein the touch lead wire comprises a first portion extending in a direction of a gate line and a second portion extending in a direction of a data line;
   the first metal layer comprises a plurality of pedestals corresponding to the respective self-capacitance touch electrodes one to one; and the pedestal is provided therein with a via hole, via which the self-capacitance touch electrode is connected with the corresponding touch lead wire.

3. The self-capacitance type touch display panel according to claim 1, wherein
   the self-capacitance touch electrodes are arranged in a matrix and the plurality of common electrodes of each self-capacitance touch electrode are also arranged in a matrix,
   a plurality of common electrodes of each row of common electrodes of each self-capacitance touch electrode are connected with one another via connection lines, and common electrodes of each self-capacitance touch electrode located in adjacent rows and in a same column are connected with one another via jumpers in the first metal layer or via jumpers in a pixel electrode layer.

4. The self-capacitance type touch display panel according to claim 3, wherein the connection lines connecting the plurality of common electrodes of each row of common electrodes of each self-capacitance touch electrode are located in a same layer as a gate line and in parallel with each other;
   the self-capacitance type touch display panel further comprises a second metal layer, which is located in a same layer as the gate electrode metal layer and is arranged in parallel connection with the first metal layer.

5. A method of manufacturing the self-capacitance type touch display panel according to claim 1, comprising:
   forming a pattern of self-capacitance touch electrodes which are arranged in a matrix on a base substrate, each formed self-capacitance touch electrode comprising a plurality of common electrodes; and
   forming a pattern of first metal layer on the base substrate formed with the pattern of self-capacitance touch electrodes.

6. The method according to claim 5, wherein before or after forming the pattern of self-capacitance touch electrodes in a matrix on the base substrate, the method further comprises:
   forming a pattern of a gate electrode, a gate line and a connection line through one time patterning process; or
   forming a pattern of a gate electrode, a gate line, a connection line and a second metal layer through one time patterning process.

7. The method according to claim 6, wherein forming the pattern of first metal layer on the base substrate formed with the pattern of self-capacitance touch electrodes comprises:
   forming a pattern of source/drain electrode layer on the base substrate formed with the pattern of first metal layer; or forming the pattern of the first metal layer on the base substrate formed with the pattern of source/drain electrode layer.

8. The method according to claim 7, further comprises:
forming a pattern comprising a passivation layer and a pixel electrode on the base substrate formed with the pattern of first metal layer.

9. A method for driving the self-capacitance type touch display panel according to claim 1, comprising:
during a display stage, applying a common electrode signal to the touch lead wires of the touch display panel while sequentially applying a gate scan signal to gate lines and a data signal to data lines of the touch display panel; and
during a touch stage, applying a touch scan signal to the touch lead wires of the touch display panel while applying synchronization signals modulated with the touch scan signal to the gate lines and the data lines of the touch display panel, such that a touch signal, which is generated by the self-capacitance touch electrode at a position where a touch operation occurs, is transmitted by the touch lead wire to the touch control chip, and the position where the touch operation occurs is determined by the touch control chip based on the touch signal.

10. A mutual-capacitance type touch display panel, comprising: an array substrate provided with a first metal layer and touch driving electrodes arranged in a matrix, a touch control chip and a color filter substrate provided with touch sensing electrodes; wherein
each touch driving electrode comprises a plurality of common electrodes, the first metal layer comprises a plurality of touch driving lead wires corresponding to respective columns of touch driving electrodes one to one, each column of touch driving electrodes being connected with the touch control chip via a corresponding touch driving lead wire;
the touch driving lead wire is configured to transmit a common electrode signal to the touch driving electrode during a display stage and to transmit a touch scan signal to the touch driving electrode during a touch stage, the touch sensing electrode is configured to couple the touch scan signal and output the coupled touch signal to the touch control chip, and the touch control chip is configured to determine a position where a touch operation occurs based on the touch signal,
wherein if a gate electrode metal layer is arranged immediately adjacent to a base substrate of the array substrate,
the first metal layer is located between the gate electrode metal layer and a source/drain electrode layer, and these three layers are insulated from one another; or
the first metal layer is located above and insulated from the source/drain electrode layer.

11. The mutual-capacitance type touch display panel according to claim 10, wherein the touch driving lead wire comprises a first portion extending in a direction of a gate line and a second portion extending in a direction of a data line;
the first metal layer comprises a plurality of pedestals corresponding to the respective touch driving electrodes one to one; and the pedestal is provided therein with a via hole, via which the touch driving electrode is connected with the corresponding touch driving lead wire.

12. The mutual-capacitance type touch display panel according to claim 10, wherein the plurality of common electrodes of each touch driving electrode are arranged in a matrix,
a plurality of common electrodes of each row of common electrodes of each touch driving electrode are connected with one another via connection lines, and common electrodes of each touch driving electrode located in adjacent rows and in a same column are connected with one another via jumpers in the first metal layer or via jumpers in a pixel electrode layer.

13. The mutual-capacitance type touch display panel according to claim 12, wherein the connection lines connecting the plurality of common electrodes of each row of common electrodes of each touch driving electrode are located in a same layer as a gate line and in parallel with each other;
the mutual-capacitance type touch display panel, further comprises a second metal layer, which is located in a same layer as the gate electrode metal layer and is arranged in parallel connection with the first metal layer;
the first metal layer comprises two sets of touch driving lead wires arranged in a bilateral symmetry way, each column of touch driving electrode corresponds to two touch driving lead wires;
the common electrode is provided between two adjacent rows of touch driving electrodes, and the touch sensing electrodes on the color filter substrate are arranged to correspond to and to be parallel to respective ones of the common electrodes.

14. A method of manufacturing the mutual-capacitance type touch display panel according to claim 10, comprising:
forming a pattern of touch driving electrodes which are arranged in a matrix on a base substrate, each touch driving electrode comprising a plurality of common electrodes;
forming a pattern of a first metal layer on the base substrate formed with the pattern of touch driving electrodes; and
forming a pattern of touch sensing electrodes on a color filter substrate.

15. The method according to claim 14, wherein before or after forming the pattern of touch driving electrodes which are arranged in a matrix on the base substrate, the method further comprises:
forming a pattern of a gate electrode, a gate line and a connection line through one time patterning process; or
forming a pattern of a gate electrode, a gate line, a connection line and a second metal layer through one time patterning process;
wherein forming the pattern of first metal layer on the base substrate formed with the pattern of touch driving electrodes comprises:
forming a pattern of source/drain electrode layer on the base substrate formed with the pattern of first metal layer, or
forming the pattern of the first metal layer on the base substrate formed with the pattern of source/drain electrode layer;
wherein the method further comprises:
forming a pattern comprising a passivation layer and a pixel electrode on the base substrate formed with the pattern of the first metal layer.

16. A method of driving the mutual-capacitance type touch display panel according to claim 10, comprising:

during a display stage, applying a common electrode signal to the touch driving lead wires of the touch display panel while sequentially applying a gate scan signal to gate lines and a data signal to data lines of the touch display panel; and during a touch stage, applying a touch scan signal to the touch driving lead wires of the touch display panel while applying synchronization signals modulated with the touch scan signal to the gate lines and the data lines of the touch display panel, such that the touch sensing electrode couples the touch scan signal and outputs the coupled touch signal to the touch control chip, and the touch control chip determines a position where a touch operation occurs based on the touch signal.

17. A display device, comprising the self-capacitance type touch display panel according to claim 1.

18. A display device, comprising the mutual-capacitance type touch display panel according to claim 7.

* * * * *